United States Patent
Park et al.

(10) Patent No.: US 9,871,628 B2
(45) Date of Patent: *Jan. 16, 2018

(54) NIB COMP TRANSMISSION METHOD AND DEVICE IN WIRELESS COMMUNICATION SYSTEM

(71) Applicant: LG ELECTRONICS INC., Seoul (KR)

(72) Inventors: Jonghyun Park, Seoul (KR); Kijun Kim, Seoul (KR); Hanbyul Seo, Seoul (KR); Hanjun Park, Seoul (KR); Byounghoon Kim, Seoul (KR); Hyungtae Kim, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 147 days.

This patent is subject to a terminal disclaimer.

(21) Appl. No.: 14/775,543

(22) PCT Filed: Jul. 29, 2014

(86) PCT No.: PCT/KR2014/006940
§ 371 (c)(1),
(2) Date: Sep. 11, 2015

(87) PCT Pub. No.: WO2015/016582
PCT Pub. Date: Feb. 5, 2015

(65) Prior Publication Data
US 2016/0036571 A1     Feb. 4, 2016

Related U.S. Application Data

(60) Provisional application No. 61/859,762, filed on Jul. 29, 2013, provisional application No. 61/871,881, (Continued)

(51) Int. Cl.
*H04L 5/00* (2006.01)
*H04B 7/024* (2017.01)
(Continued)

(52) U.S. Cl.
CPC .......... *H04L 5/0035* (2013.01); *H04B 7/024* (2013.01); *H04B 7/0617* (2013.01);
(Continued)

(58) Field of Classification Search
None
See application file for complete search history.

(56) References Cited

U.S. PATENT DOCUMENTS

2009/0111473 A1   4/2009  Tao et al.
2011/0103287 A1   5/2011  Ma et al.
(Continued)

FOREIGN PATENT DOCUMENTS

CN    101873661    10/2010
CN    102291228    12/2011
WO    2012093858    7/2012

OTHER PUBLICATIONS

PCT International Application No. PCT/KR2014/006940, Written Opinion of the International Searching Authority dated Nov. 10, 2014, 15 pages.
(Continued)

*Primary Examiner* — Chi H Pham
*Assistant Examiner* — Raul Rivas
(74) *Attorney, Agent, or Firm* — Lee Hong Degerman Kang Waimey

(57) ABSTRACT

The present invention relates to a wireless communication system, and more particularly, to a method and device for performing or supporting NIB coordinated multi-point (CoMP) transmission in a wireless communication system. The method for performing NIB CoMP transmission in the
(Continued)

(a)

(b)

wireless communication system according to an embodiment of the present invention may include: receiving signaling comprising at least one CoMP hypothesis set and at least one benefit metric information bit from a first network node, at a second network node; performing CoMP transmission based on the at least one CoMP hypothesis set, at the second network node. The at least one CoMP hypothesis set and the at least one benefit metric information bit are defined in information element format included in the signaling, and information indicated by the at least one benefit metric information comprises specific information, for which the at least one benefit metric information configured as special value.

10 Claims, 14 Drawing Sheets

Related U.S. Application Data filed on Aug. 30, 2013, provisional application No. 61/912,007, filed on Dec. 4, 2013, provisional application No. 61/926,380, filed on Jan. 12, 2014, provisional application No. 61/927,968, filed on Jan. 15, 2014, provisional application No. 61/929,966, filed on Jan. 21, 2014, provisional application No. 61/952,881, filed on Mar. 14, 2014, provisional application No. 61/968,976, filed on Mar. 21, 2014, provisional application No. 61/972,425, filed on Mar. 31, 2014.

(51) Int. Cl.
*H04W 72/04* (2009.01)
*H04B 7/06* (2006.01)
*H04W 92/20* (2009.01)

(52) U.S. Cl.
CPC ......... *H04B 7/0632* (2013.01); *H04B 7/0639* (2013.01); *H04L 5/0048* (2013.01); *H04L 5/0094* (2013.01); *H04W 72/044* (2013.01); *H04W 72/0406* (2013.01); *H04L 5/0023* (2013.01); *H04W 92/20* (2013.01)

(56) References Cited

U.S. PATENT DOCUMENTS

| | | | |
|---|---|---|---|
| 2012/0189077 A1 | 7/2012 | Seo et al. | |
| 2013/0021929 A1* | 1/2013 | Kim | H04B 7/024 370/252 |
| 2013/0155973 A1* | 6/2013 | Geirhofer | H04B 7/0632 370/329 |
| 2013/0225193 A1* | 8/2013 | Lee | H04W 72/1231 455/452.2 |
| 2013/0286849 A1* | 10/2013 | Park | H04B 7/024 370/241 |

OTHER PUBLICATIONS

3rd Generation Partnership Project (3GPP), "Technical Specification Group Radio Access Network; Coordinated multi-point operation for LTE physical layer aspects (Release 11)," 3GPP TR 36.819 V11.1.0, Dec. 2011, 70 pages.

Barbieri, et al., "Coordinated Downlink Multi-Point Communications in Heterogeneous Cellular Networks," Information theory and applications workshop (ITA), Feb. 2012, 10 pages.

PCT International Application No. PCT/KR2014/006940, Written Opinion of the International Searching Authority dated Nov. 10, 2014, 11 pages.

The State Intellectual Property Office of the People's Republic of China Application Serial No. 201480027087.X, Office Action dated Nov. 3, 2017, 7 pages.

\* cited by examiner

FIG. 5
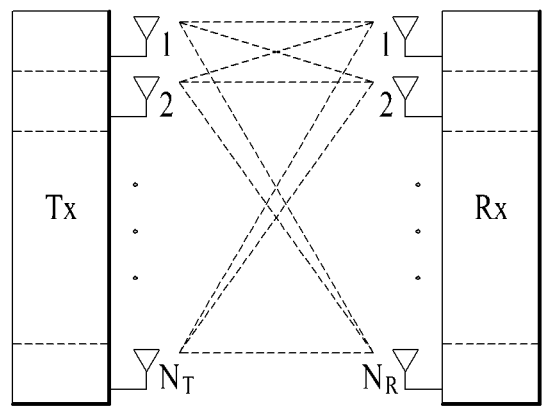
(a)
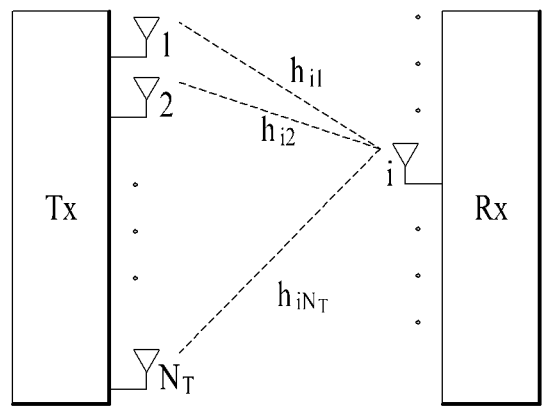
(b)

NIB COMP TRANSMISSION METHOD AND DEVICE IN WIRELESS COMMUNICATION SYSTEM

CROSS-REFERENCE TO RELATED APPLICATIONS

This application is the National Stage filing under 35 U.S.C. 371 of International Application No. PCT/KR2014/006940, filed on Jul. 29, 2014, which claims the benefit of U.S. Provisional Application No. 61/859,762, filed on Jul. 29, 2013, 61/871,881, filed on Aug. 30, 2013, 61/912,007, filed on Dec. 4, 2013, 61/926,380, filed on Jan. 12, 2014, 61/927,968, filed on Jan. 15, 2014, 61/929,966, filed on Jan. 21, 2014, 61/952,881, filed on Mar. 14, 2014, 61/968,976, filed on Mar. 21, 2014 and 61/972,425, filed on Mar. 31, 2014, the contents of which are all hereby incorporated by reference herein in their entirety.

TECHNICAL FIELD

The present disclosure relates to a wireless communication system and, more particularly, to a method and device for performing or supporting NIB CoMP transmission in a wireless communication system.

BACKGROUND ART

Multiple-Input Multiple-Output (MIMO) is a technology for improving efficiency of data transmission and reception using multiple transmit antennas and multiple receive antennas rather than using one transmit antenna and one receive antenna. If a single antenna is used, a receive entity receives data through a single antenna path. In contrast, if multiple antennas are used, the receive entity receives data through several paths, accordingly data transmission rate and throughput may be improved, and the coverage may be extended.

To increase multiplexing gain of the MIMO operation, an MIMO transmit entity may use channel state information (CSI) fed back by the MIMO receive entity. The receive entity may determine the CSI by performing channel measurement using a predetermined reference signal (RS) from the transmit entity.

Research has been actively conducted on a coordinated multi-point (CoMP) system for improving throughput for a user at the cell boundary by applying improved MIMO transmission in a multi-cell environment. With the CoMP system, inter-cell interference may be reduced in the multi-cell environment, and overall system performance may be improved. For example, CoMP techniques include joint processing (JP) of performing common computational processing between neighboring cells by grouping multiple neighboring cells and considering the same as a virtual MIMO system and cooperative beamforming (C-BF) capable of solving the problem of inter-cell interference by adjusting a beam pattern between neighboring cells.

DISCLOSURE

Technical Problem

An object of the present invention devised to solve the problem lies in a method for accurately and efficiently performing or supporting CoMP operation when delay is present in signal transmission and reception between points participating in CoMP (in, for example, a non-ideal backhaul (NIB) network).

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing coordinated multi-point (CoMP) transmission on a wireless communication network, the method including transmitting first type signaling from a first network node to a second network node, the first type signaling containing one or more first CoMP hypothesis sets, and receiving, at the first network node, second type signaling from the second network node, the second type signaling containing one or more second CoMP hypothesis sets. The first type signaling and the second type signaling may be defined by the same information element format, and the first type signaling or the second type signaling may be identified based on a specific bit of the information element format.

In another aspect of the present invention, provided herein is a network node for performing coordinated multi-point (CoMP) transmission on a wireless communication network, the network node including a transceiver, and a processor, wherein the processor is configured to transmit first type signaling from a first network node to a second network node using the transceiver, the first type signaling containing one or more first CoMP hypothesis sets and receive, at the first network node, second type signaling from the second network node using the transceiver, the second type signaling containing one or more second CoMP hypothesis sets. The first type signaling and the second type signaling may be defined by the same information element format, and the first type signaling or the second type signaling may be identified based on a specific bit of the information element format.

The above aspects of the present invention may include the following details.

A benefit metric information bit may be defined in the information element format, wherein the benefit metric information bit may be set to a value indicating a benefit metric in the first type signaling, wherein the benefit metric information may be reserved, omitted, or set to a special value in the second type signaling.

Each of the one or more first or second CoMP hypothesis sets may be associated with one benefit metric, wherein the benefit metric may have a quantized value of a benefit expected for CoMP transmission scheduling on an assumption of a CoMP hypothesis set associated therewith.

Each of the one or more first or second CoMP hypothesis sets may include an identifier (ID) of each of the CoMP network nodes and information about a transmission assumption for each of the CoMP network nodes.

A transmission assumption for each of the CoMP network nodes may include at least one of indication of muting, a transmit power level and precoding information.

At least one of the first type signaling and the second type signaling may contain information indicating at least one of a time interval and a frequency band, the time interval and frequency band being related to the CoMP transmission.

The information indicating the time interval may include information about a frame number, the CoMP transmission starting at the frame number.

The information indicating the frequency band may include information about subbands, the CoMP transmission being performed in the subbands, wherein each of the subbands may include a plurality of resource blocks (RBs), wherein a size of each of the subbands may increase when a system bandwidth increases.

At least one of the first type signaling and the second type signaling may include at least one of one or more sets of channel state information (CSI) about a user equipment (UE) set, one or more measurement reports on a set of the UEs, an SRS reception power for the set of the UEs, a user perceived throughput for the set of the UEs, and transmit power information, the transmit power information being defined in one or more domains of frequency, time, power and space domains with respect to at least one of the CoMP network nodes.

The first network node may be a member network node of a centralized coordination architecture, and the second network node may be a central network node (CCN) of the centralized coordination architecture A link between the CoMP network nodes may be a non-ideal backhaul (NIB) link.

An interface between the CoMP network nodes may be an X2 interface.

The above general description and the following detailed description of the present invention are exemplarily given to supplement the recitations in the claims.

Advantageous Effects

According to embodiments of the present invention, a method for accurately and efficiently performing or supporting CoMP operation when delay is present in signal transmission and reception between points participating in CoMP (in, for example, an NIB network) may be provided.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates configuration of a wireless communication system having multiple antennas;

FIG. 15 illustrates a benefit metric signaled together with a CoMP hypothesis for a frequency/time resource map;

BEST MODE

Figure 1:
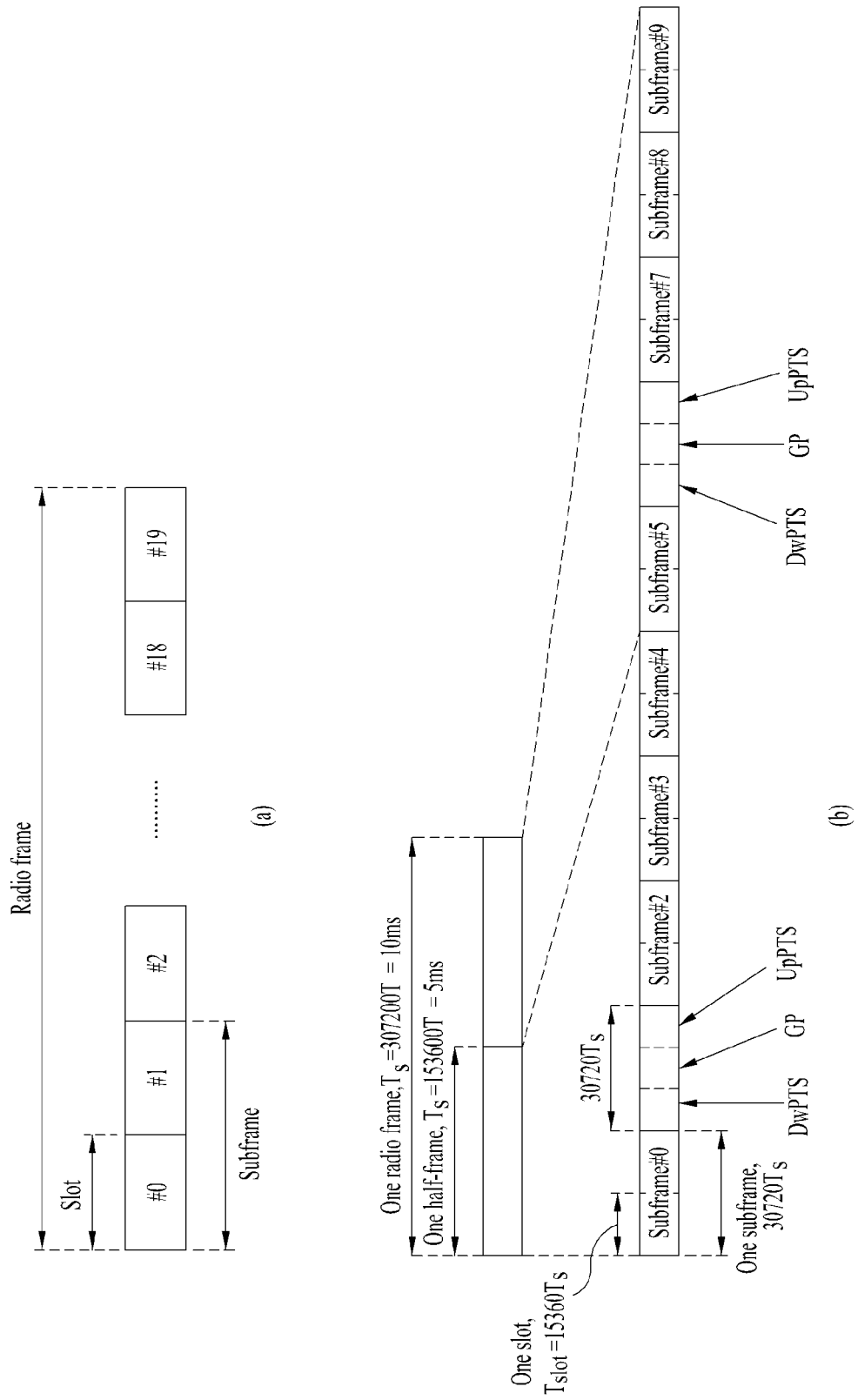
FIG. 1 illustrates a radio frame structure.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or may be substituted for corresponding configurations or features of another embodiment.

In this specification, embodiments of the present invention are described centering on the data transmission/reception relations between a base station and a user equipment. In this case, a base station has a meaning of a terminal node of a network directly communicating with a user equipment. In this disclosure, a specific operation explained as performed by a base station may be performed by an upper node of the base station in some cases.

In particular, in a network constructed with a plurality of network nodes including a base station, it is apparent that various operations performed for communication with a user equipment may be performed by a base station or other network nodes except the base station. 'Base station (BS)' may be substituted with such a terminology as a fixed station, a Node B, an eNode B (eNB), an access point (AP), Remote Radio Head (RRD), Transmission point (TP), Reception Point (RP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies may be modified into a different form in a range of not deviating from the technical idea of the present invention.

Occasionally, to prevent the present invention from getting vaguer, structures and/or devices known to the public are skipped or may be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA may be implemented with such a radio technology as UTRA (universal terrestrial radio access), CDMA 2000 and the like. TDMA may be implemented with such a radio technology as GSM/GPRS/EDGE (Global System for Mobile communications)/General Packet Radio Service/Enhanced Data Rates for GSM Evolution). OFDMA may be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

FIG. 1 is a diagram for a structure for a radio frame of 3GPP LTE system.

In a cellular OFDM (orthogonal frequency division multiplex) radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1 (a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce the inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1 (b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. Subframe consisting of DwPTS, GP and UpPTS refers to special subframe. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The above-described structures of the radio frame are exemplary only. And, the number of subframes included in a radio frame, the number of slots included in the subframe and the number of symbols included in the slot may be modified in various ways.

Figure 2:
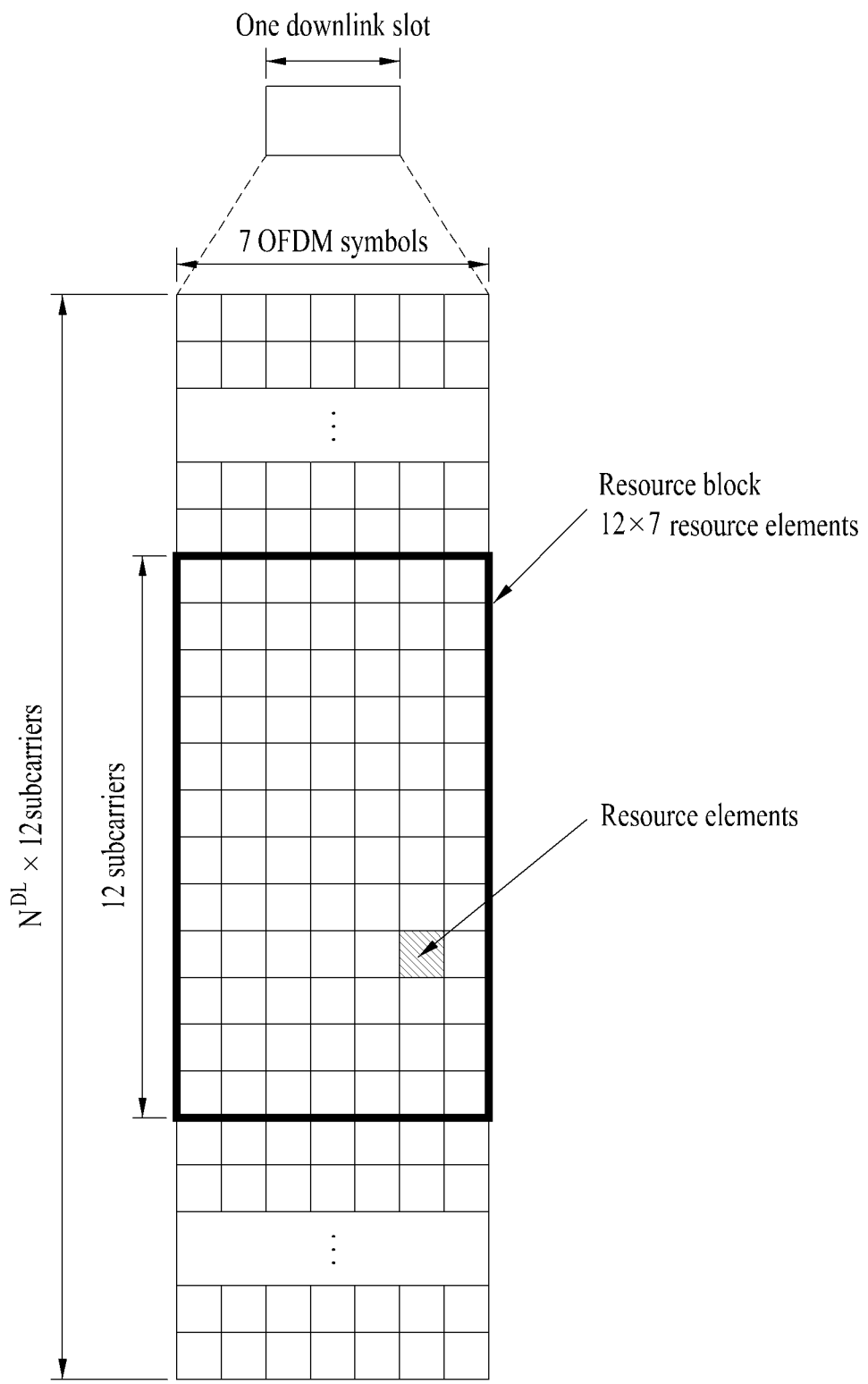
FIG. 2 is a diagram illustrating a resource grid for one downlink (DL) slot.

FIG. 2 is a diagram for a resource grid in a downlink slot.

Referring to FIG. 2, one downlink (DL) slot includes 7 OFDM symbols in time domain and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
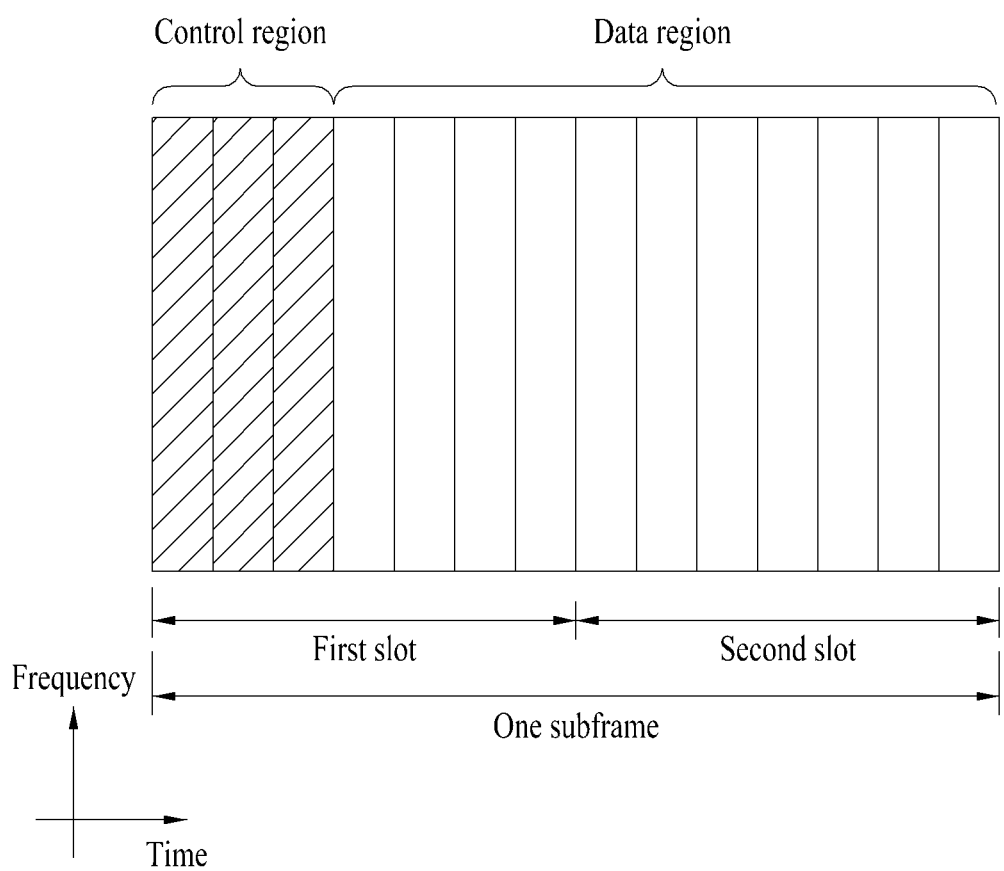
FIG. 3 is a diagram illustrating a DL subframe structure.

FIG. 3 is a diagram for a structure of a downlink (DL) subframe.

A maximum of 3 OFDM symbols situated in a head part of a first slot of one subframe correspond to a control region to which control channels are assigned. The rest of OFDM symbols correspond to a data region to which PDSCH (physical downlink shared channel) is assigned.

Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs may be transmitted in a control region and a user equipment is able to monitor a plurality of the PDCCHs.

PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs.

A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC may be masked with a unique identifier of the user equipment, i.e., C-RNTI (i.e., Cell-RNTI). If the PDCCH is provided for a paging message, the CRC may be masked with a paging indication identifier (e.g., P-RNTI (Paging-RNTI)). If the PDCCH is provided for system information, and more particularly, for a system information block (SIB), the CRC may be masked with a system information identifier (e.g., SI-RNTI (system information-RNTI). In order to indicate a random access response that is a response to a transmission of a random access preamble of a user equipment, CRC may be masked with RA-RNTI (random access-RNTI).

Figure 4:
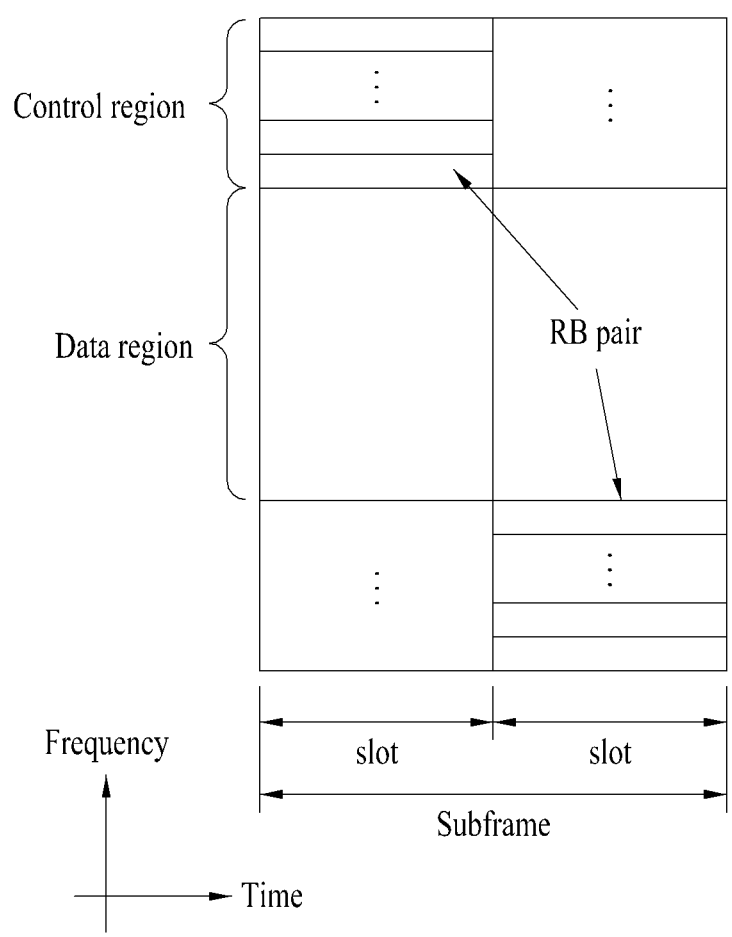
FIG. 4 is a diagram illustrating an uplink (UL) subframe structure.

FIG. 4 is a diagram for a structure of an uplink (UL) subframe.

Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Modeling of MIMO System

FIG. 5 illustrates configuration of a wireless communication system having multiple antennas.

Referring to FIG. 5(a), if the number of transmit (Tx) antennas increases to NT, and the number of receive (Rx) antennas increases to NR, a theoretical channel transmission capacity of the wireless communication system increases in proportion to the number of antennas, differently from a case in which only a transmitter or receiver uses multiple antennas, and accordingly transmission rate and frequency efficiency may be significantly increased. In this case, the transfer rate acquired by the increased channel transmission capacity may be theoretically increased by a predetermined amount that corresponds to multiplication of a maximum transfer rate (Ro) acquired when one antenna is used by a rate of increase (Ri). The rate of increase (Ri) may be represented by the following Equation 1.

$$R_i = \min(N_T, N_R) \quad \text{[Equation 1]}$$

For example, provided that a MIMO system uses four Tx antennas and four Rx antennas, the MIMO system may theoretically acquire a high transfer rate which is four times that of a single antenna system. After the above-mentioned theoretical capacity increase of the MIMO system was demonstrated in the mid-1990s, many developers began to conduct intensive research into a variety of technologies which may substantially increase data transfer rate using the theoretical capacity increase. Some of the above technologies have been adopted in a variety of wireless communication standards such as, for example, third-generation mobile communication and next-generation wireless LAN.

A variety of MIMO-associated technologies have been intensively researched. For example, research into information theory associated with MIMO communication capacity under various channel environments or multiple access environments, research into radio frequency (RF) channel measurement and modeling of the MIMO system, and research into space-time signal processing technology have been conducted.

Mathematical modeling of a communication method for use in the aforementioned MIMO system will hereinafter be described in detail. It is assumed that the system includes $N_T$ Tx antennas and $N_R$ Rx antennas.

In the case of a transmission signal, the maximum number of pieces of transmittable information is $N_T$ under the condition that $N_T$ Tx antennas are used, and the transmission information may be represented by the following equation.

$$s = [s_1, s_2, \ldots, s_{N_T}]^T \quad \text{[Equation 2]}$$

Individual pieces of transmission information $s_1, s_2, \ldots, s_{N_T}$ may have different transmit powers. In this case, if the individual transmit powers are denoted by $P_1, P_2, \ldots, P_{N_T}$, transmission information having an adjusted transmit power may be represented by the following equation.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Ŝ may be represented by the following equation using a diagonal matrix P of transmit powers.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Suppose that a weight matrix W is applied to the information vector Ŝ for which transmit powers have been adjusted, thereby $N_T$ transmission signals $x_1, x_2, \ldots, x_{NT}$ to be actually transmitted are configured. The weight matrix W serves to properly distribute transmission information to individual antennas according to transmission channel situations. The above-mentioned transmission signals $x_1, x_2, \ldots, x_{NT}$ may be represented by the following equation using vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = $$ [Equation 5]

$$W\hat{s} = WPs$$

Here, $W_{ij}$ denotes a weight corresponding to the i-th Tx antenna and the j-th information. W is also called a precoding matrix.

When $N_R$ Rx antennas are used, received signals $y_1, y_2, \ldots, y_{NR}$ of individual antennas may be represented by a vector shown in the following equation.

$$y = [y_1, y_2, \ldots, y_{N_R}]^T$$ [Equation 6]

When channel modeling is executed in the MIMO communication system, individual channels may be distinguished from each other according to Tx/Rx antenna indexes. A specific channel from a Tx antenna j to an Rx antenna i is denoted by $h_{ij}$. Regarding $h_{ij}$, it should be noted that an Rx antenna index is located ahead of a Tx antenna index.

FIG. 5(b) shows channels from $N_T$ Tx antennas to Rx antenna i. The channels may be represented in the form of a vector or matrix. Referring to FIG. 5(b), the channels from the $N_T$ Tx antennas to the Rx antenna i may be represented by the following equation.

$$h_i^T = [h_{i1}, h_{i2}, \ldots, h_{iN_T}]$$ [Equation 7]

All channels from the $N_T$ Tx antennas to $N_R$ Rx antennas may also be represented as the following.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix}$$ [Equation 8]

Additive white Gaussian noise (AWGN) is added to an actual channel after application of a channel matrix H. AWGN $n_1, n_2, \ldots, n_{NR}$ added to each of $N_R$ Rx antennas may be represented by the following equation.

$$n = [n_1, n_2, \ldots, n_{N_R}]^T$$ [Equation 9]

Reception signal calculated by the mathematical modeling described above may be represented by the following equation.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = $$ [Equation 10]

$$Hx + n$$

The number of rows and the number of columns of channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix.

A rank of a matrix is defined by the smaller of the number of rows and the number of columns, in which the rows and the columns are independent of each other. Therefore, the matrix rank may not be higher than the number of rows or columns. The rank of the channel matrix H may be represented by the following equation.

$$\text{rank}(H) \leq \min(N_T, N_R)$$ [Equation 11]

The rank may be defined as the number of non-zero Eigen values when Eigen value decomposition is performed on the matrix. Similarly, the rank may be defined as the number of non-zero singular values when singular value decomposition is performed on the matrix. Accordingly, the rank of the channel matrix refers to a maximum number of pieces of information that may be transmitted on a given channel.

In this specification, "rank" with respect to MIMO transmission indicates the number of paths through which signals may be independently transmitted at specific time in a specific frequency resource and "the number of layers" refers to the number of signal streams transmitted through each path. Since a transmitter transmits as many layers as the rank used in signal transmission, the rank corresponds to the number of layers unless otherwise mentioned.

Reference Signal (RS)

When a packet is transmitted in a wireless communication system, since the packet is transmitted via a radio channel, a signal may be distorted in the course of transmission. In order for a receiving end to correctly receive a distorted signal, it may be preferable that the distorted and received signal is corrected using channel information. In order to find out the channel information, a signal known to both of a transmitting end and the receiving end is transmitted and finds out the channel information with the extent of distortion when the signal is received on a channel. The signal is called a pilot signal or a reference signal.

When a data is transmitted/received using MIMO antenna, it may be preferable that a channel state between a transmitting antenna and a receiving antenna is detected in order for a receiving end to correctly receive the data. Hence, in order for the receiving end to detect the channel state, each transmitting antenna of the transmitting end may preferably have an individual reference signal.

In a wireless communication system, RSs may be broadly divided into two types according to the purposes thereof. One type is used to acquire channel information and the other type is used for data demodulation. Since the former RS is used to allow the UE to acquire DL channel information, this RS should be transmitted over a wide band, and even a UE which does not receive DL data in a specific subframe should receive and measure the RS. Such RS is also used for measurement of, for example, handover. The latter RS is sent when an eNB sends a resource on downlink. The UE may perform channel measurement by receiving this RS, thereby implementing data modulation. This RS should be transmitted in a region in which data is transmitted.

Legacy 3GPP LTE systems (e.g., 3GPP LTE Release-8) define two types of downlink RSs for the unicast service. One is a common RS (CRS), and the other is a dedicated RS (DRS). The CRS is used for acquisition of information about the channel state and measurement of, for example, handover, and may be referred to as a cell-specific RS. The DRS is used for data demodulation, and may be referred to as a UE-specific RS. In the legacy 3GPP LTE systems, the DRS may be used only for data demodulation, and the CRS may be used for both acquisition of channel information and data demodulation.

The CRS is transmitted cell-specifically in every subframe in a wideband. The CRS may be transmitted with respect to up to four antenna ports depending on the number of Tx antennas of the eNB. For example, if the number of Tx antennas of the eNB is 2, CRSs for antenna ports #0 and #1 are transmitted. If the number of Tx antennas of the eNB is 4, CRSs for antenna ports #0 to #3 are respectively transmitted.

Figure 6:
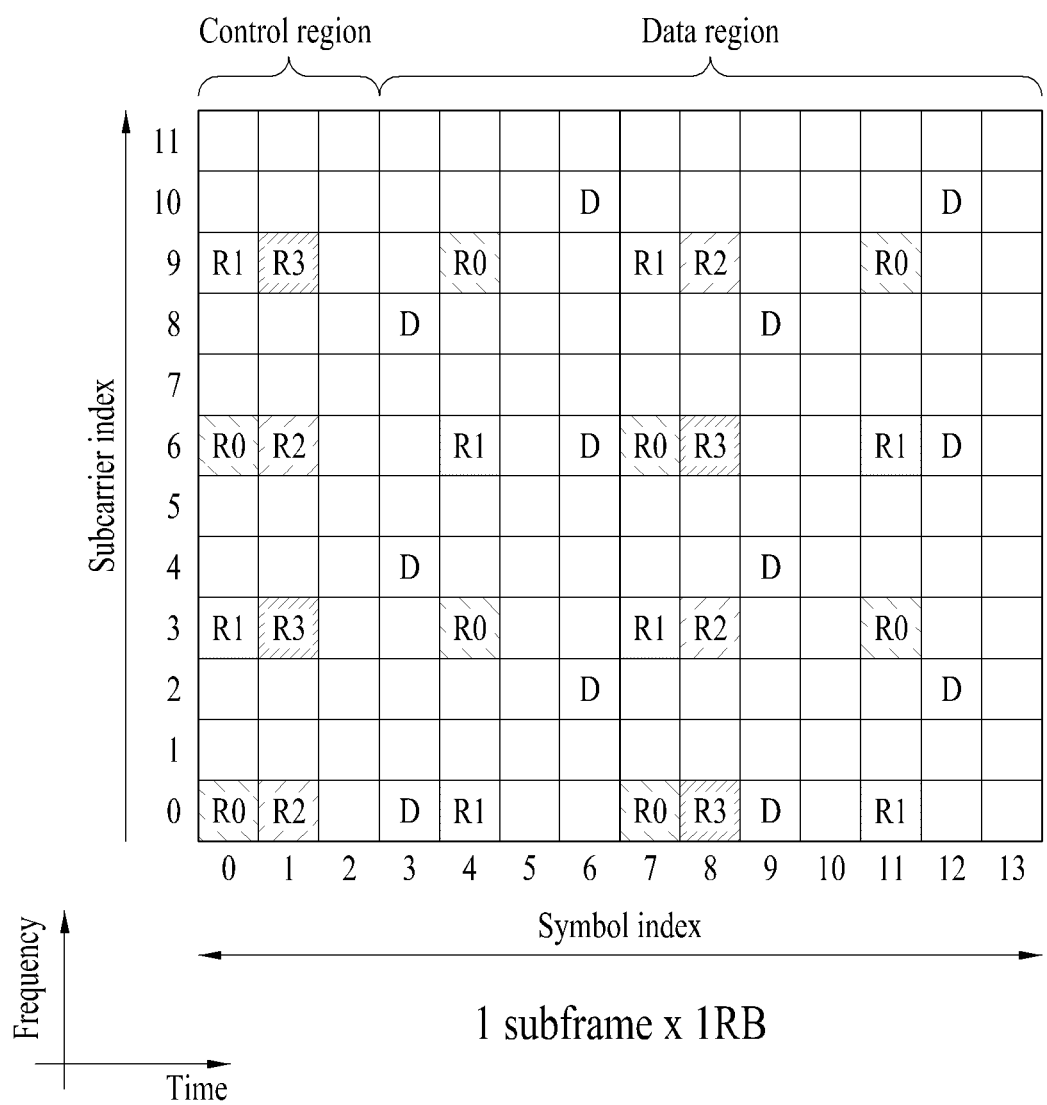
FIG. 6 is a diagram illustrating an exemplary pattern of a CRS and a DRS on one RB pair.

FIG. 6 is a diagram for an exemplary pattern of CRS and DRS on a resource block (RB) pair.

As an example of reference signal pattern, FIG. 6 shows a pattern of CRS and DRS on a RB pair (normap CP case, 14 OFDM symbol in time domain×12 subcarriers in frequency domain) in a system supporting 4 antennas by a base station. In FIG. 6, resource elements (RE) represented as 'R0', 'R1', 'R2', and 'R3' indicate positions of the CRS for an antenna port 0, 1, 2, and 3, respectively. Meanwhile, resource elements represented as 'ID' in FIG. 6 indicates positions of the DRS.

LTE-A, which is an advanced version of LTE, can support up to 8 Tx antennas on downlink. Accordingly, RSs for up to 8 Tx antennas need to be supported in LTE-A. In LTE, downlink RSs are defined only for up to 4 antenna ports. Therefore, if an eNB has 4 to 8 DL Tx antennas in LTE-A, RSs for these antenna ports need to be additionally defined. As the RSs for up to 8 Tx antenna ports, both the RS for channel measurement and the RS for data demodulation need to be considered.

One important consideration in designing an LTE-A system is backward compatibility. Backward compatibility refers to supporting the legacy LTE UE such that the legacy LTE UE normally operates in the LTE-A system. In terms of RS transmission, if RSs for up to 8 Tx antennas are added to a time-frequency region in which a CRS defined in the LTE standard is transmitted in every subframe over the full band, RS overhead excessively increases. Accordingly, in designing new RSs for up to 8 antenna ports, reduction in RS overhead needs to be considered.

The new RSs introduced in LTE-A may be classified into two types. One is a channel state information-RS (CSI-RS) intended for channel measurement for selecting a transmission rank, a modulation and coding scheme (MCS), a precoding matrix index (PMI), and the like, and the other is a demodulation RS (DMRS) intended for demodulation of data transmitted through up to 8 Tx antennas.

The CSI-RS intended for channel measurement is designed only for channel measurement, unlike the existing CRS, which is used for data demodulation as well as for channel measurement and handover measurement. Of course, the CSI-RS may also be used for handover measurement. Since the CSI-RS is transmitted only in order to obtain information about channel states, the CSI-RS need not be transmitted in every subframe, unlike the CRS for the legacy LTE system. Accordingly, to reduce overhead of the CSI-RS, the CSI-RS may be designed to be intermittently (e.g., periodically) transmitted in the time domain.

When data is transmitted in a certain DL subframe, a dedicated DMRS is transmitted to a UE for which data transmission is scheduled. That is, the DMRS may be referred to as a UE-specific RS. A DMRS dedicated to a specific UE may be designed to be transmitted only in a resource region in which the UE is scheduled, i.e., the time-frequency region in which data for the UE is transmitted.

Figure 7:
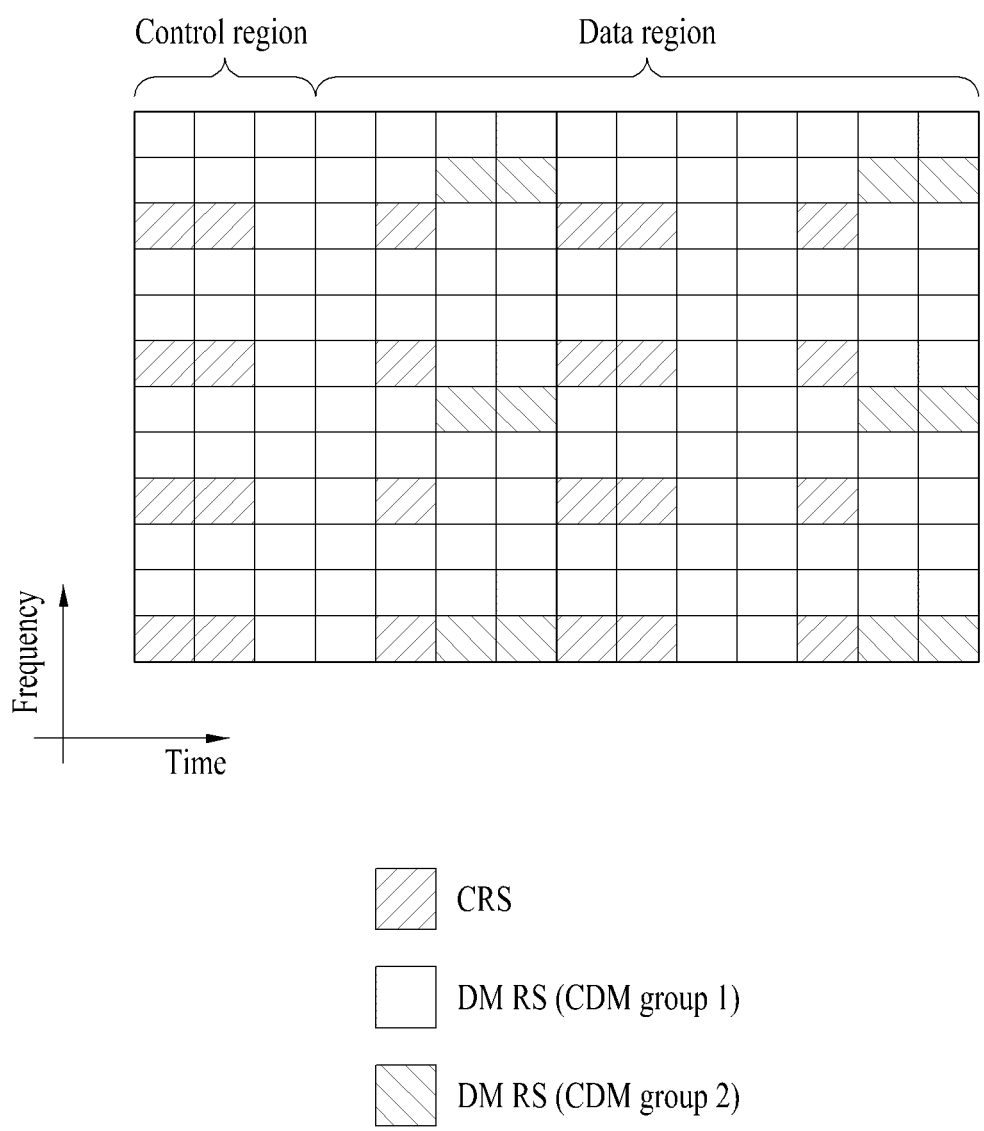
FIG. 7 is a diagram illustrating an exemplary DMRS pattern defined in LTE-A.

FIG. 7 is a diagram for an example of a DMRS pattern defined in LTE-A system.

FIG. 7 shows a position of a resource element to which a DMRS is transmitted on one resource block pair (in case of a normal CP, 14 OFDM symbols in time domain×12 subcarriers in frequency domain) in which DL data is transmitted. The DMRS may be transmitted in response to 8 antenna ports (antenna port index 7, 8, 9, 10) additionally defined in LTE-A system. The DMRS for antenna ports different from each other may be distinguished from each other in a manner of being positioned at frequency resources (subcarriers) different from each other and/or time resources (OFDM symbols) different from each other (i.e., the DM RS for antenna ports different from each other may be multiplexed by FDM and/or TDM scheme). And, the DMRS for antenna ports different from each other positioned at an identical time-frequency resource may be distinguished from each other by an orthogonal code (i.e., the DMRS for antenna ports different from each other may be multiplexed by CDM scheme). In the example of FIG. 7, DMRSs for antenna ports 7 and 8 may be positioned on the REs indicated by DMRS CDM Group 1 and be multiplexed by an orthogonal code. Similarly, in the example of FIG. 7, DMRSs for antenna ports 9 and 10 may be positioned on the REs indicated by DMRS Group 2 and be multiplexed by the orthogonal code.

When the eNB transmits a DMRS, precoding applied to data is applied to the DMRS. Accordingly, the channel information estimated by the UE using the DMRS (or UE-specific RS) is precoded channel information. The UE may easily perform data demodulation using the precoded channel information estimated through the DMRS. However, the UE does not know the information about the precoding applied to the DMRS, and accordingly the UE may not acquire, from the DMRS, channel information that is not precoded. The UE may acquire the channel information that is not precoded, using an RS separate from the DMRS, namely using the CSI-RS mentioned above.

Figure 8:
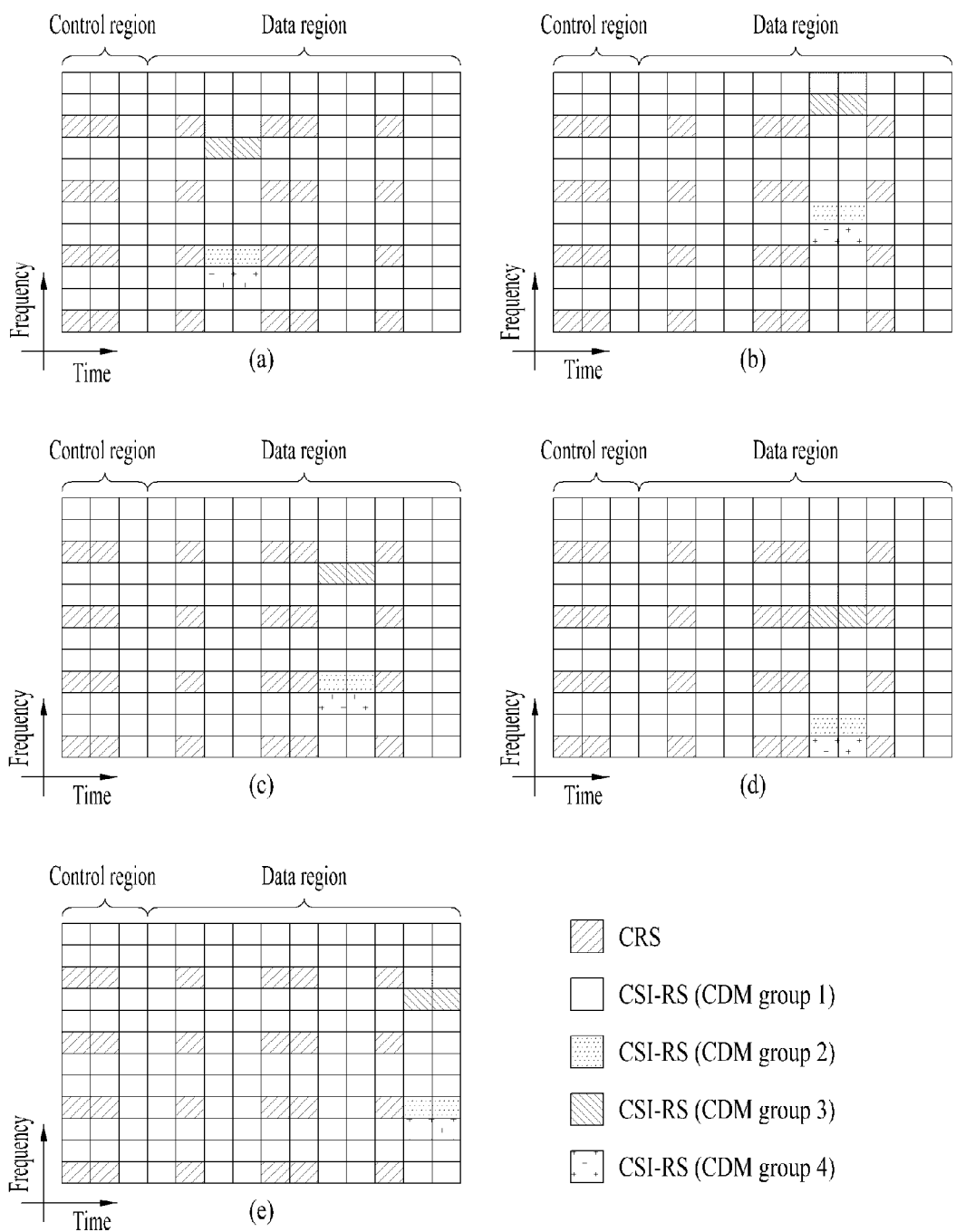
FIG. 8 is a diagram illustrating exemplary CSI-RS patterns defined in LTE-A.

FIG. 8 is a diagram for examples of a CSI-RS pattern defined in LTE-A system.

FIG. 8 shows a position of a resource element to which a CSI-RS is transmitted on one resource block pair (in case of a normal CP, 14 OFDM symbols in time domain×12 subcarriers in frequency domain) in which DL data is transmitted. One CSI-RS pattern among patterns depicted in FIG. 8 (a) to FIG. 8 (e) may be used in a prescribed DL subframe. The CSI-RS may be transmitted in response to 8 antenna ports (antenna port index 15, 16, 17, 18, 19, 20, 21 and 22) additionally defined in LTE-A system. The CSI-RS for antenna ports different from each other may be distinguished from each other in a manner of being positioned at frequency resources (subcarriers) different from each other and/or time resources (OFDM symbols) different from each other (i.e., the CSI-RS for antenna ports different from each other may be multiplexed by FDM and/or TDM scheme). And, the CSI-RS for antenna ports different from each other positioned at an identical time-frequency resource may be distinguished from each other by an orthogonal code (i.e., the CSI-RS for antenna ports different from each other may be multiplexed by CDM scheme). Referring to the example of FIG. 8 (a), CSI-RSs for an antenna port 15 and 16 may be positioned at resource elements (REs) represented as a CSI-RS CDM group 1 and the CSI-RSs for the antenna port 15 and 16 may be multiplexed by the orthogonal code. Referring to the example of FIG. 8 (a), CSI-RSs for an antenna port 17 and 18 may be positioned at resource elements (REs) represented as a CSI-RS CDM group 2 and the CSI-RSs for the antenna port 17 and 18 may be multiplexed by the orthogonal code. Referring to the example of FIG. 7 (a), CSI-RSs for an antenna port 19 and 20 may be positioned at resource elements (REs) represented as a CSI-RS CDM group 3 and the CSI-RSs for the antenna port 19 and 20 may be multiplexed by the orthogonal code. Referring to the example of FIG. 8 (a), CSI-RSs for an antenna port 21 and 22 may be positioned at resource elements (REs) represented as a CSI-RS CDM group 4 and the CSI-RSs for the antenna port 21 and 22 may be multiplexed by the orthogonal code. A principle explained on the basis of FIG. 8 (a) may be identically applied to FIG. 8 (b) to FIG. 8 (e).

The RS patterns depicted in FIG. 6 to FIG. 8 are just examples. Various examples of the present invention may be non-limited to a specific RS pattern. In particular, in case of using an RS pattern different from the RS patterns depicted in FIG. 6 to FIG. 8, various embodiments of the present invention may also be identically applied to the RS pattern.

CSI-RS Configuration

As described above, in the LTE-A system supporting up to 8 Tx antennas on downlink, an eNB needs to transmit CSI-RSs for all antenna ports. Since transmitting CSI-RSs for a maximum of 8 Tx antenna ports in every subframe excessively increases overhead, the CSI-RS may need to be intermittently transmitted in the time domain to reduce overhead, rather than being transmitted in every subframe. Accordingly, the CSI-RS may be periodically transmitted with a periodicity corresponding to an integer multiple of one subframe or transmitted in a specific transmission pattern.

Here, the periodicity or pattern in which the CSI-RS is transmitted may be configured by a network (e.g., an eNB). To perform CSI-RS-based measurement, the UE should be aware of a CSI-RS configuration for each CSI-RS antenna port of a cell (or a TP) to which the UE belongs. The CSI-RS configuration may include the index of a downlink subframe in which a CSI-RS is transmitted, time-frequency positions (e.g., a CSI-RS pattern as shown in FIGS. 8(a) to 8(e)) of CSI-RS REs in a transmission subframe, and a CSI-RS sequence (which is a sequence that is intended for CSI-RS and is pseudo-randomly generated based on the slot number, cell ID, CP length and the like according to a predetermined rule). That is, a given eNB may use a plurality of CSI-RS configurations, and inform UE(s) in a cell of CSI-RS configurations to be used for the UE(s) among the CSI-RS configurations.

The plurality of CSI-RS configurations may or may not include a CSI-RS configuration for which the UE assumes that the transmit power of the CSI-RS is non-zero. In addition, the plurality of CSI-RS configurations may or may not include at least one CSI-RS configuration for which the UE assumes that the transmit power of the CSI-RS is zero transmit power.

Further, each bit of a parameter (e.g., a 16-bit bitmap ZeroPowerCSI-RS parameter) for a CSI-RS configuration of zero transmit power may be caused by a higher layer to correspond to the CSI-RS configuration (or REs to which CSI-RSs can be allocated according to the CSI-RS configuration), and the UE may assume that the transmit power on the CSI-RS REs of a CSI-RS configuration corresponding to a bit set to 1 in the parameter is 0.

Since CSI-RSs for the respective antenna ports need to be distinguished from each other, resources on which the CSI-RSs for the antenna ports are transmitted need to be orthogonal to each other. As described above in relation to FIG. 8, the CSI-RSs for the antenna ports may be multiplexed using FDM, TDM and/or CDM using orthogonal frequency resources, orthogonal time resources and/or orthogonal code resources.

When the eNB informs a UE belonging to a cell thereof of information about CSI-RSs, the eNB needs to signal information about time and frequency to which a CSI-RS for each antenna port is mapped. Specifically, the information about time may include the subframe numbers of subframes in which the CSI-RS is transmitted, a CSI-RS transmission periodicity for transmission of the CSI-RS, a subframe offset for transmission of the CSI-RS, and a number corresponding to an OFDM symbol on which a CSI-RS RE of a specific antenna is transmitted. The information about frequency may include spacing of frequencies at which a CSI-RS RE of a specific antenna is transmitted, and an RE offset or a shift value in the frequency domain.

Figure 9:
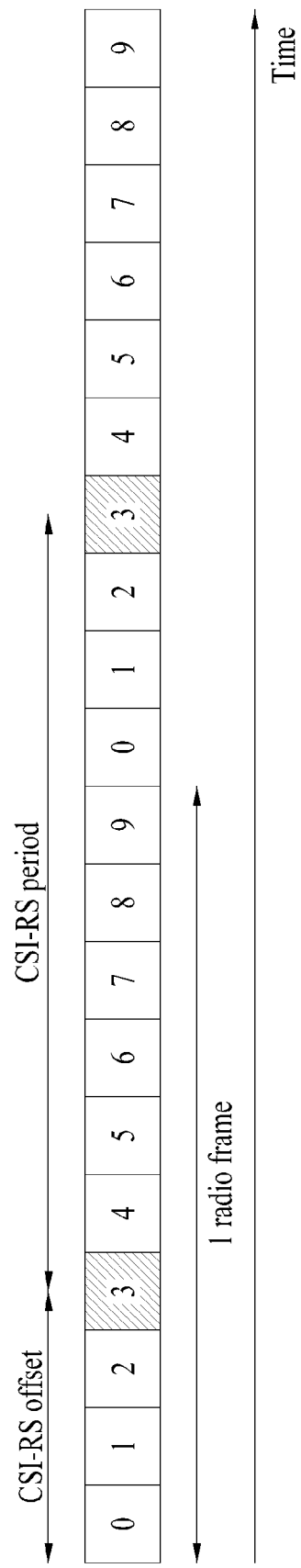
FIG. 9 is a diagram illustrating an exemplary scheme in which a CSI-RS is periodically transmitted.

FIG. 9 is a diagram illustrating an exemplary scheme in which a CSI-RS is periodically transmitted.

The CSI-RS may be periodically transmitted with a periodicity corresponding to an integer multiple of one subframe (e.g., 5 subframes, 10 subframes, 20 subframes, 40 subframes, or 80 subframes).

FIG. 9 illustrates a case in which one radio frame consists of 10 subframes (from subframe 0 to subframe 9). In the example illustrated in FIG. 9, the transmission periodicity of the CSI-RS of the eNB is 10 ms (i.e., 10 subframes), and the CSI-RS transmission offset is 3. Different offset values may be assigned to eNBs such that CSI-RSs of several cells are uniformly distributed in the time domain. When the CSI-RS is transmitted with a periodicity of 10 ms, the offset may be set to a value between 0 and 9. Similarly, when the CSI-RS is transmitted with a periodicity of, for example, 5 ms, the offset may be set to a value between 0 and 4. When the CSI-RS is transmitted with a periodicity of 20 ms, the offset may be set to a value between 0 and 19. When the CSI-RS is transmitted with a periodicity of 40 ms, the offset may be set to a value between 0 and 39. When the CSI-RS is transmitted with a periodicity of 80 ms, the offset may be set to a value between 0 and 79. The offset value indicates the value of a subframe in which an eNB transmitting the CSI-RS with a predetermined periodicity starts CSI-RS transmission. When the eNB informs the UE of the transmission periodicity and the offset value of the CSI-RS, the UE may receive the CSI-RS of the eNB at the corresponding subframe position, using the values. The UE may measure a channel through the received CSI-RS, and report information such as CQI, PMI and/or rank indicator (RI) to the eNB as a result of the measurement. The CQI, the PMI and the RI may be collectively referred to as CQI (or CSI) throughout the specification unless they are separately described. The aforementioned information related to the CSI-RS is cell-specific information and may be applied to the UEs in a cell in common. The CSI-RS transmission periodicity and offset may be separately specified for each CSI-RS configuration. For example, a separate CSI-RS transmission periodicity and offset may be set for a CSI-RS configuration representing a CSI-RS transmitted with zero transmit power and a CSI-RS configuration representing a CSI-RS transmitted with non-zero transmit power.

Contrary to the CRS transmitted in all subframes in which a PDSCH can be transmitted, the CSI-RS may be configured to be transmitted only in some subframes. For example, CSI subframe sets $C_{CSI,0}$ and $C_{CSI,1}$ may be configured by a higher layer. A CSI reference resource (i.e., a predetermined resource region forming the basis of CSI calculation) may belong to $C_{CSI,0}$ or $C_{CSI,1}$, but may not belong to $C_{CSI,0}$ and $C_{CSI,1}$ at the same time. Accordingly, when CSI subframe sets $C_{CSI,0}$ and $C_{CSI,1}$ are configured by a higher layer, the UE is not allowed to expect that it will receive a trigger (or an indication for CSI calculation) for a CSI reference resource which is present in a subframe which belongs to none of the CSI subframe sets.

Alternatively, the CSI reference resource may be configured in a valid downlink subframe. The valid downlink subframe may be configured as a subframe satisfying various requirements. In the case of periodic CSI reporting, one of the requirements may be that the subframe should belong to a CSI subframe set that is linked to periodic CSI reporting if the CSI subframe set is configured for the UE.

The UE may derive a CQI index from the CSI reference resource in consideration of the following assumptions (For details, see 3GPP TS 36.213):

First three OFDM symbols in a subframe are occupied by control signaling

No REs are used by a primary synchronization signal, a secondary synchronization signal, or a physical broadcast channel (PBCH).

CP length of a non-Multicast Broadcast Single Frequency Network (MBSFN) subframe.

Redundancy version is 0.

If a CSI-RS is used for channel measurement, the ratio of PDSCH energy per resource element (EPRE) to CSI-RS EPRE conforms to a predetermined rule.

For CSI reporting in transmission mode 9 (i.e., the mode supporting up to S-layer transmission), if the UE is configured for PMI/RI reporting, it is assumed that DMRS overhead corresponds to the most recently reported rank. For example, in the case of two or more antenna ports (i.e., rank less than or equal to 2) as described in FIG. 7, DMRS overhead on one RB pair is 12 REs, whereas DMRS overhead in the case of three or more antenna ports (i.e., rank greater than or equal to 3) is 24 REs. Therefore, a CQI index may be calculated on the assumption of DMRS overhead corresponding to the most recently reported rank value.

No REs are allocated to a CSI-RS and a zero-power CSI-RS.

No REs are allocated to a positioning RS (PRS).

The PDSCH transmission scheme conforms to a transmission mode currently set for the UE (the mode may be a default mode).

The ratio of PDSCH EPRE to cell-specific RS EPRE conforms to a predetermined rule.

The eNB may inform UEs of such a CSI-RS configuration through, for example, radio resource control (RRC) signaling. That is, information about the CSI-RS configuration may be provided to UEs in a cell using dedicated RRC signaling. For example, while a UE establishes a connection with the eNB through initial access or handover, the eNB may inform the UE of the CSI-RS configuration through RRC signaling. Alternatively, when the eNB transmits, to a UE, an RRC signaling message demanding channel state feedback based on CSI-RS measurement, the eNB may inform the UE of the CSI-RS configuration through the RRC signaling message.

Meanwhile, locations of the CSI-RS in the time domain, i.e. a cell-specific subframe configuration period and a cell-specific subframe offset, may be summarized as shown in Table 1 below.

TABLE 1

| CSI-RS subframe configuration $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

As described above, parameter $I_{CSI-RS}$ may be separately configured for a CSI-RS assumed to have a non-zero transmit power by the UE and a CSI-RS assumed to have zero transmit power by the UE. A subframe including a CSI-RS may be represented by Equation 12 below (In Equation 12, $n_f$ is a system frame number and $n_s$ is a slot number).

$$(10n_f + \lfloor n_s/2 \rfloor - \Delta_{CSI-RS}) \bmod T_{CSI-RS} = 0 \quad \text{[Equation 12]}$$

Channel State Information (CSI)

MIMO schemes may be classified into open-loop MIMO and closed-loop MIMO. In open-loop MIMO, a MIMO transmitter performs MIMO transmission without receiving CSI feedback from a MIMO receiver. In closed-loop MIMO, the MIMO transmitter receives CSI feedback from the MIMO receiver and then performs MIMO transmission. In closed-loop MIMO, each of the transmitter and the receiver may perform beamforming based on the CSI to achieve a multiplexing gain of MIMO Tx antennas. To allow the receiver (e.g., a UE) to feed back CSI, the transmitter (e.g., an eNB) may allocate a UL control channel or a UL-SCH to the receiver.

The UE may perform estimation and/or measurement of a downlink channel using a CRS and/or a CSI-RS. The CSI fed back to the eNB by the UE may include a rank indicator (RI), a precoding matrix indicator (PMI), and a channel quality indicator (CQI).

The RI is information about a channel rank. The channel rank represents the maximum number of layers (or streams) that can carry different pieces of information in the same time-frequency resources. Since rank is determined mainly according to long-term fading of a channel, the RI may be fed back with a longer periodicity (namely, less frequently) than the PMI and the CQI.

The PMI is information about a precoding matrix used for transmission from a transmitter and has a value reflecting the spatial characteristics of a channel. Precoding refers to mapping transmission layers to Tx antennas. A layer-antenna mapping relationship may be determined by the precoding matrix. The PMI corresponds to an index of a precoding matrix of an eNB preferred by the UE based on a metric such as signal-to-interference-plus-noise ratio (SINR). In order to reduce the feedback overhead of precoding information, the transmitter and the receiver may pre-share a codebook including multiple precoding matrices, and only the index indicating a specific precoding matrix in the codebook may be fed back. For example, the PMI may be determined based on the most recently reported RI.

The CQI is information indicating channel quality or channel strength. The CQI may be expressed as a predetermined MCS combination. That is, a CQI index that is fed back indicates a corresponding modulation scheme and code rate. The CQI may configure a specific resource region (e.g., a region specified by a valid subframe and/or a physical RB) as a CQI reference resource and be calculated on the assumption that PDSCH transmission is present on the CQI reference resource, and the PDSCH can be received without exceeding a predetermined error probability (e.g., 0.1). Generally, the CQI has a value reflecting a received SINR which can be obtained when the eNB configures a spatial channel using a PMI. For instance, the CQI may be calculated based on the most recently reported RI and/or PMI.

In a system supporting an extended antenna configuration (e.g., an LTE-A system), additional acquisition of multi user (MU)-MIMO diversity using an MU-MIMO scheme is considered. In the MU-MIMO scheme, when an eNB performs downlink transmission using CSI fed back by one UE among multiple users, it is necessary to prevent interference with other UEs because there is an interference channel between UEs multiplexed in the antenna domain. Accordingly, CSI of higher accuracy than in a single-user (SU)-MIMO scheme should be fed back in order to correctly perform MU-MIMO operation.

A new CSI feedback scheme may be adopted by modifying the existing CSI including an RI, a PMI, and a CQI so as to measure and report more accurate CSI. For example, precoding information fed back by the receiver may be indicated by a combination of two PMIs (e.g., i1 and i2). Thereby, more precise PMI may be fed back, and more precise CQI may be calculated and reported based on such precise PMI.

Meanwhile, the CSI may be periodically transmitted over a PUCCH and or aperiodically transmitted over a PUSCH. For the RI, various reporting modes may be defined depending on which of a first PMI (e.g., W1), a second PMI (e.g., W2), and a CQI is fed back and whether the PMI and/or CQI that is fed back relates to a wideband (WB) or a subband (SB).

CQI Calculation

Hereinafter, CQI calculation will be described in detail on the assumption that the downlink receiver is a UE. However, the description of the present invention given below may also be applied to a relay station serving to perform downlink reception.

A description will be given below of a method for configuring/defining a resource (hereinafter, referred to as a reference resource) forming the basis of calculation of the CQI when the UE reports CSI. The CQI is more specifically defined below.

A CQI that the UE reports corresponds to a specific index value. The CQI index has a value indicating a modulation technique, code rate, and the like that correspond to the channel state. For example, CQI indexes and meanings thereof may be given as shown in Table 3 below.

TABLE 2

| CQI index | Modulation | Code rate × 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |

TABLE 2-continued

| CQI index | Modulation | Code rate × 1024 | Efficiency |
|---|---|---|---|
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 1 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Based on an observation which is not restricted by time and frequency, the UE may determine the highest CQI index satisfying a predetermined requirement among CQI indexes 1 to 15 of Table 3 with respect to each CQI value reported in uplink subframe n. The predetermined requirement may be that a single PDSCH transmission block which has a combination of a modulation scheme (e.g., MCS) and a transmission block size (TBS) corresponding to the CQI index and occupies a group of downlink physical RBs called a CQI reference resource should be received with a transmission block error probability not exceeding 0.1 (i.e., 10%). If even CQI index 1 does not satisfy the aforementioned requirement, the UE may determine CQI index 0.

In transmission mode 9 (corresponding to transmission of up to 8 layers) and the feedback reporting mode, the UE may perform channel measurement for calculation of the CQI value reported in uplink subframe n based only on the CSI-RS. In the other transmission modes and corresponding reporting modes, the UE may perform channel measurement for CQI calculation based on the CRS.

If all requirements given below are satisfied, a combination of a modulation scheme and a TBS may correspond to one CQI index. That is, the combination should be allowed to be signaled on a PDSCH in a CQI reference resource according to an associated TRS table, the modulation scheme should be indicated by a corresponding CQI index, and when the combination of a TBS and a modulation scheme is applied to the reference resource, a valid channel code rate as close to the code rate indicated by the CQI index as possible should be given. If two or more combinations of a TBS and a modulation scheme are almost equal to the code rate indicated by the corresponding CQI index, a combination having the smallest TBS may be determined A CQI reference resource is defined as follows.

In the frequency domain, the CQI reference resource defined as a group of downlink physical RBs corresponds to a band associated with the derived CQI value.

In the time domain, the CQI reference resource is defined as a single downlink subframe n-nCQI_ref. In the case of periodic CQI reporting, nCQI_ref is determined to have a value that is smallest among the values greater than or equal to 4 and corresponds to a downlink subframe in which downlink subframe n-nCQI_ref is valid. In the case of aperiodic CQI reporting, a downlink subframe identical to a valid downlink subframe corresponding to a CQI request in an uplink DCI format (namely, the PDCCH DCI format for providing the UE with uplink scheduling control information) (or having a received CQI request) is determined as a CQI reference resource for nCQI_ref. In aperiodic CQI reporting, nCQI_ref may be 4, and downlink subframe n-nCQI_ref may correspond to a valid downlink subframe. Herein, downlink subframe n-nCQI_ref may be received after a subframe corresponding to a CQI request in a random access response grant (or having a received CQI request). The valid downlink subframe refers to a downlink subframe that is configured for the UE, is not set as a MBSFN subframe except in transmission mode 9, and neither includes a DwPTS field if the length of DwPTS is less than or equal to 7680*Ts (Ts=1/(15000×2048) seconds), nor belongs to a measurement gap configured for the UE. If there is no valid downlink subframe for the CQI reference resource, CQI reporting is not performed in uplink subframe n.

In the layer region, the CQI reference resource is defined as an RI and PMI which the CQI presumes.

The following assumptions may be made for the UE to derive a CQI index on a CQI reference resource: (1) the first three OFDM symbols in a downlink subframe are used for control signaling; (2) there is no RE that is used by a primary synchronization signal, a secondary synchronization signal, or a PBCH; (3) CP length of a non-MBSFN subframe is given; (4) Redundancy version is 0; (5) If a CSI-RS is used for channel measurement, the ratio of PDSCH energy per resource element (EPRE) to CSI-RS EPRE has a predetermined value signaled by a higher layer; (6) a PDSCH transmission scheme (single antenna port transmission, transmit diversity, spatial multiplexing, MU-MIMO, etc.) defined for each transmission mode (e.g., a default mode) is currently set for the UE; (7) if the CRS is used for channel measurement, the ratio of PDSCH EPRE to CRS EPRE may be determined according to a predetermined requirement. For details related to definition of the CQI, see 3GPP TS 36.213.

In summary, the downlink receiver (e.g., a UE) may configure a previous specific single subframe as a CQI reference resource with respect to the current time at which it is performing CQI calculation, and when a PDSCH is transmitted from the eNB on the CQI reference resource, may calculate a CQI value such that the error probability does not exceed 10%.

CSI Process

One or more CSI processes may be configured for a UE. Each CSI process may be associated with a CSI-RS resource for channel measurement and a CSI-interference measurement resource (CSI-IM resource). Specifically, one CSI process is defined as an association between an NZP CSI-RS resource for measurement of a desired signal and an interference measurement resource (IMR) for interference measurement. Each CSI process has an independent CSI feedback configuration. The independent CSI feedback configuration represents a feedback mode (the type of CSI (RI, PMI, CQI, etc.) and a transmission order of CSIs), a periodicity of feedback and a feedback offset.

One or more CSI-IM resource configurations may be provided for a UE. Higher-layer parameters such as a zero power (ZP) CSI-RS configuration (i.e., configuration information about an RE position to which a ZP CSI-RS is mapped) and a ZP CSI-RS subframe configuration (i.e., configuration information about a periodicity and offset of occurrence of the ZP CSI-RS) may be configured for each CSI-IM resource configuration.

In addition, one or more ZP CSI-RS resource configurations may be provided for a UE. Higher-layer parameters such as a ZP CSI-RS configuration list (i.e., 16-bit bitmap information about a ZP CSI-RS) and a ZP CSI-RS subframe configuration (i.e., configuration information about a periodicity and offset of occurrence of the ZP CSI-RS) may be configured for each ZP CSI-RS resource configuration.

Carrier Aggregation

Before description is given of carrier aggregation, the concept of a cell introduced to manage radio resources in LTE-A will be described first. A cell may be understood as a combination of downlink resources and uplink resources. Here, the uplink resource is not an essential element of the cell. Accordingly, a cell may include only downlink resources or include downlink resources and uplink resources. The downlink resource may be referred to as a downlink component carrier (DL CC), and the uplink resource may be referred to as an uplink component carrier (UL CC). The DL CC and the UL CC may be represented by carrier frequencies, and a carrier frequency represents a center frequency within the corresponding cell.

Cells may be divided into a primary cell (PCell), which operates at a primary frequency, and a secondary cell (SCell), which operates at a secondary frequency. The PCell and the SCell may be collectively referred to as a serving cell. A cell designated when the UE performs an initial connection establishment procedure or during a connection re-establishment procedure or a handover procedure, may serve as the PCell. In other words, the PCell may be understood as a cell that serves as a control-related center in a carrier aggregation environment, which will be described in detail later. A UE may be assigned a PUCCH in the PCell thereof and may then transmit the assigned PUCCH. The SCell may be configured after establishment of radio resource control (RRC) connection, and SCell may be used for providing additional radio resources. In the carrier aggregation environment, all serving cells except the PCell may be viewed as SCells. In the case in which a UE is in an RRC_CONNECTED state but carrier aggregation is not established or in a case in which the UE does not support carrier aggregation, only a single serving cell consisting of PCells exists. On the other hand, in the case in which a UE is in the RRC_CONNECTED state and carrier aggregation is established therefor, one or more serving cells exist, and PCells and all SCells are included in all serving cells. For a UE supporting carrier aggregation, after an initial security activation procedure is initiated, the network may configure one or more SCells in addition to a PCell configured at the beginning of the connection establishment procedure.

Carrier aggregation is a technology that has been introduced to allow for use of a broader band in order to meet the requirements of a high-speed transmission rate. Carrier aggregation may be defined as aggregation of two or more component carriers (CCs) having different carrier frequencies or aggregation of two or more cells. Herein, CCs may be consecutive or non-consecutive in the frequency domain The UE may simultaneously receive and monitor downlink data from a plurality of DL CCs. A linkage between a DL CC and a UL CC may be indicated by the system information. The DL CC/UL CC link may be fixed in the system or may be semi-statically configured. Additionally, even if the entire system band consists of N CCs, the frequency band in which a specific UE can perform monitoring/reception may be limited to M(<N) CCs. Various parameters for carrier aggregation may be set up in a cell-specific, UE group-specific, or UE-specific manner.

Cross-carrier scheduling refers to, for example, including all downlink scheduling allocation information about a DL CC in the control region of another DL CC for one of multiple serving cells or including all UL scheduling grant information about multiple UL CCs linked to a DL CC for one of multiple serving cells in the control region of the DL CC.

Regarding cross-carrier scheduling, a carrier indicator field (CIF) will be described first. The CIF may be included in the DCI format transmitted over the PDCCH (and be defined to have, for example, a size of 3 bits), or may not be included in the DCI format (in this case, the CIF may be defined to have, for example, a size of 0 bits). If the CIF is included in the DCI format, this indicates that cross-carrier scheduling is applied. In the case in which cross-carrier scheduling is not applied, the downlink scheduling allocation information is valid within the DL CC through which downlink scheduling allocation information is currently being transmitted. Additionally, the uplink scheduling grant is valid for a UL CC linked to the DL CC through which the downlink scheduling allocation information is transmitted.

In the case in which cross-carrier scheduling is applied, the CIF indicates a CC related to the downlink scheduling allocation information which is transmitted over the PDCCH in a DL CC. For example, downlink allocation information about DL CC B and DL CC C, i.e., information about PDSCH resources, is transmitted over the PDCCH within the control region of DL CC A. The UE may monitor DL CC A so as to recognize the resource region of the PDSCH and the corresponding CC through the CIF.

Whether or not the CIF is included in the PDCCH may be semi-statically set, and the CIF may be UE-specifically enabled by higher-layer signaling.

When the CIF is disabled, the PDCCH in a specific DL CC allocates a PDSCH resource in the same DL CC and may also allocate a PUSCH resource in a UL CC linked to the specific DL CC. In this case, the same coding scheme, CCE-based resource mapping and DCI format as used in the legacy PDCCH structure may be applied.

When the CIF is enabled, the PDCCH in a specific DL CC may allocate a PDSCH/PUSCH resource within a single DL/UL CC indicated by the CIF, among the multiple aggregated CCs. In this case, a CIF may be additionally defined in the legacy PDCCH DCI format. The CIF may be defined as a field having a fixed length of 3 bits, or the CIF position may be fixed regardless of the size of the DCI format. The coding scheme, CCE-based resource mapping, DCI format, and so on of the legacy PDCCH structure may be applied to this case.

When the CIF exists, an eNB may allocate a DL CC set in which the PDCCH is to be monitored. Accordingly, UE burden of blind decoding may be lessened. The PDCCH monitoring CC set corresponds to a portion of all aggregated DL CCs, and the UE may perform PDCCH detection/decoding only in the corresponding CC set. In other words, in order to perform PDSCH/PUSCH scheduling for a UE, the eNB may transmit the PDCCH only in the PDCCH monitoring CC set. The PDCCH monitoring CC set may be UE-specifically, UE group-specifically or cell-specifically configured. For example, when 3 DL CCs are aggregated, DL CC A may be configured as a PDCCH monitoring DL CC. If the CIF is disabled, the PDCCH in each DL CC may schedule only the PDSCH within the DL CC A. On the other hand, if the CIF is enabled, the PDCCH in DL CC A may schedule not only the PDCCH of the DL CC A but also the PDSCH of the other DL CCs. In the case where the DL CC A is configured as the PDCCH monitoring CC, the PDCCH may not be transmitted in DL CC B and DL CC C.

Quasi Co-Location (QCL)

A QC or QCL (Quasi Co-Located) relationship can be explained in terms of a signal or channel.

When large-scale properties of a signal received through one antenna port can be inferred from another signal received through another antenna port, the two antenna ports may be said to be QCL. Herein, the large-scale properties may include at least one of a delay spread, a Doppler shift, a frequency shift, an average received power, and received timing.

Alternatively, two antenna ports may be said to be QCL when large-scale properties of a channel over which a symbol on one antenna port is transmitted can be inferred from properties of a channel over which another symbol on the other antenna port is transmitted. Herein, the large-scale properties may include at least one of a delay spread, a Doppler spread, a Doppler shift, an average gain, and an average delay.

In this disclosure, definition of the term QC or QCL is not distinguished among the signals or channels described above.

The UE may assume that any two antenna ports having the QCL assumption established therebetween are co-located even if the antenna ports are not actually co-located. For example, the UE may assume that two antenna ports having the QCL assumption established therebetween are at the same transmission point (TP).

For example, a specific CSI-RS antenna port, a specific downlink DMRS antenna port, and a specific CRS antenna port may be configured to be QCL. This configuration may correspond to a case in which the specific CSI-RS antenna port, the specific downlink DMRS antenna port, and the specific CRS antenna port are from one serving cell.

Alternatively, a CSI-RS antenna port and a downlink DMRS antenna port may be configured to be QCL. For example, in a CoMP environment in which a plurality of TPs participates, a TP from which a CSI-RS antenna port is actually transmitted may not be explicitly known to the UE. In this case, the UE may be informed that a specific CSI-RS antenna port and a specific DMRS antenna port are QCL. This may correspond to a case in which the specific CSI-RS antenna port and the specific DMRS antenna port are from a certain TP.

In this case, the UE may increase the performance of channel estimation through a DMRS, based on the information about large-scale properties of a channel acquired using a CSI-RS or a CRS. For example, the UE may perform an operation of, for example, attenuating interference of a channel estimated through the DMRS, using the delay spread of a channel estimated through the CSI-RS.

For example, regarding delay spread and Doppler spread, the UE may apply estimation results of the power-delay-profile, the delay spread and Doppler spectrum and the Doppler spread for one antenna port to a Wiener filter which is used in performing channel estimation for another antenna port. In addition, regarding frequency shift and received timing, after the UE performs time and frequency synchronization for an antenna port, it may apply the same synchronization to demodulation on another antenna port. Further, regarding average received power, the UE may average measurements of reference signal received power (RSRP) over two or more antenna ports.

For example, the UE may receive DL scheduling information through a specific DMRS-based DL-related DCI format over a PDCCH or an enhanced-PDCCH (EPDCCH). In this case, the UE performs channel estimation of a scheduled PDSCH through a configured DMRS sequence and then performs data demodulation. For example, if the UE can make a QCL assumption that a DMRS port configuration received from the DL scheduling information and a port for a specific RS (e.g., a specific CSI-RS, a specific CRS, a DL serving cell CRS of the UE, etc.) are QCL, then the UE may apply the estimates of the large-scale properties such as the delay spread estimated through the port for the specific RS to implementation of channel estimation through the DMRS port, thereby improving performance of DMRS-based reception.

This is because the CSI-RS or CRS is a cell-specific signal transmitted over the full band in the frequency domain, and thus allows for more accurate recognition of large-scale properties of a channel than the DMRS. Particularly, the CRS is a reference signal that is broadcast with a relatively high density over the full band in every subframe as described above, and thus, generally, estimates of the large-scale properties of a channel may be more stably and accurately acquired from the CRS. On the other hand, the DMRS is UE-specifically transmitted only on specific scheduled RBs, and accordingly accuracy of estimates of the large-scale properties of a channel is lower than in the case of the CRS or the CSI-RS. In addition, even if a plurality of physical resource block groups (PBRGs) is scheduled for a UE, an effective channel received by the UE may change on a PRBG-by-PRBG basis since a precoding matrix that the eNB uses for transmission may change on the PRBG-by-PRBG basis. Thereby, the accuracy of estimation may be lowered even if large-scale properties of a radio channel are estimated based on the DMRS over a wide band.

For antenna ports (APs) which are not QCL (non-quasi-co-located (NQC)), the UE cannot assume that the APs have the same large-scale properties. In this case, the UE needs to perform independent processing for each NQC AP regarding timing acquisition and tracking, frequency offset estimation and compensation, delay estimation, and Doppler estimation.

PDSCH Resource Mapping Parameters

Information indicating whether or not APs are QCL may be provided to the UE through DL control information (e.g., a PQI field of DCI format 2D (a PDSCH RE mapping and QCL indicator field)). Specifically, parameter sets (e.g., a maximum of four parameter sets) for a QCL configuration may be preconfigured by a higher layer, and a specific one of the QCL parameter sets may be indicated through the PQI field of DCI format 2D.

In addition, to decode a PDSCH transmitted on APs #7 to #14 (i.e., UE-specific RS APs), at least one of QCL type A and type B may be configured for the UE by a higher layer (according to, for example, higher layer parameter qcl-operation).

QCL type A may be an operation of the UE assuming that APs #0 to #3 (i.e., CRS APs), #7 to #14 (i.e., UE-specific RS APs) and #15 to #22 (i.e., CSI-RS AP) are QCL with respect to delay spread, Doppler spread, Doppler shift and average delay.

QCL type B may be an operation of the UE assuming that APs #15 to #22 (i.e., CSI-RS APs) corresponding to CSI-RS resource configurations identified by non-zero power (NZP) CSI-RS configuration information (qcl-CSI-RS-ConfigNZ-PId-r11) given by a higher layer and APs #7 to #14 (i.e., UE-specific RS APs) associated with PDSCH are QCL with respect to delay spread, Doppler spread, Doppler shift and average delay.

A UE set to QCL type B may determine PDSCH RE mapping using a parameter set indicate by the PQI field of DCI format 2D of the detected PDCCH/EPDCCH and also determine PDSCH AP QCL. Table 3 below shows the PQI field of DCI format 2D.

TABLE 3

| Value of the PQI field | Description |
| --- | --- |
| '00' | Parameter set 1 configured by a higher layer |
| '01' | Parameter set 2 configured by a higher layer |
| '10' | Parameter set 3 configured by a higher layer |
| '11' | Parameter set 4 configured by a higher layer |

Each parameter set for determining PDSCH RE mapping and PDSCH AP QCL configured by higher layer signaling may include at least one parameter of CRS port count information (crs-PortsCount-r11), CRS frequency shift information (crs-FreqShift-r11), MBSFN (Multicast Broadcast Single Frequency Network) subframe configuration information (mbsfn-SubframeConfigList-r11), ZP CSI-RS (Zero Power Channel State Information-Reference Signal) configuration information (csi-RS-ConfigZPId-r11), a PDSCH start symbol value (pdsch-Start-r11) and NZP (Non-Zero Power) CSI-RS configuration information (qcl-CSI-RS-ConfigNZPId-r11).

The UE set to QCL type B may decode PDSCH transmitted through AP #7 using parameter set 1 of Table 3, by which the UE detects a PDCCH/EPDCCH of DCI format 1A CRC-masked with C-RNTI.

In decoding the PDSCH scheduled according to PDCCH/EPDCCH of DCI format 1A, if the PDSCH is transmitted through APs #0 to #3 (i.e., CRS APs), the UE may determine PDSCH RE mapping using a ZP CSI-RS resource having the lowest index.

Antenna Port QCL for PDSCH

A UE may assume that APs #0 to #3 (i.e., CRS APs) of the serving cell are QCL with respect to delay spread, Doppler spread, Doppler shift, average gain and average delay.

The UE may assume that APs #7 to #14 (i.e., UE-specific RS APs) of the serving cell are QCL with respect to delay spread, Doppler spread, Doppler shift, average gain and average delay.

The UE may assume that APs #0 to #3 (i.e., CRS APs), #5 (i.e., UE-Specific RS APs defined in 3GPP LTE Release 8), #7 to #14 (i.e., UE-Specific RS APs defined after 3GPP LTE Release 9) and #15 to #22 (i.e., CSI-RS APs) are QCL with respect to Doppler shift, Doppler spread, average delay and average spread.

Definition of CSI-RS in Consideration of QCL

In addition to the description of CSI-RS configurations given above, definition of a CSI-RS in consideration of QCL is described below.

One or more CSI-RS resource configurations may be provided for a UE by a higher layer. The CSI-RS resource configuration may include at least one of CSI-RS resource configuration identification information, the number of CSI-RS ports, a CSI-RS configuration (i.e., configuration for an RE position to which a CSI-RS is mapped), a CSI-RS subframe configuration, a UE assumption about transmit power of a reference PDSCH for each CSI process, a pseudo-random sequence generator parameter, and a higher layer parameter (gel-CRS-Info-r 11) for an assumption on CRS APs and CSI-RS APs for QCL type B. Herein, the parameter gel-CRS-Info-r11 may include a pseudo-random sequence generator parameter (qcl-ScramblingIdentity-r11), a CRS port count parameter (crs-PortsCount-r11) and an MBSFN subframe configuration information (mbsfn-SubframeConfigList-r11).

The UE may assume that CSI-RS APs for one CSI-RS resource configuration are QCL with respect to average spread, Doppler spread, Doppler shift, average gain and average delay.

A UE set to QCL type B may assume that CRS APs #0 to #3 related to the gel-CRS-Info-r11 parameter corresponding to a CSI-RS resource configuration and CSI-RS APs #15 to #22 corresponding to the CSI-RS resource configuration are QCL with respect to Doppler shift and Doppler spread.

Coordinated Multi-Point (CoMP)

To satisfy requirements for enhanced system performance of the 3GPP LTE-A system, CoMP transmission and reception technology (also called co-MIMO, collaborative MIMO or network MIMO) has been proposed. CoMP technology may increase the performance of UEs located at a cell edge and the average sector throughput.

In a multi-cell environment with a frequency reuse factor of 1, the performance of a UE located at a cell edge and the average sector throughput may be lowered due to inter-cell interference (ICI). To attenuate ICI, the legacy LTE system has adopted a simple passive technique such as fractional frequency reuse (FFR) based on UE-specific power control such that a UE located at a cell edge may have appropriate throughput in an environment constrained by interference. However, attenuating the ICI or reusing ICI as a desired signal for the UE may be more preferable than lowering use of frequency resources per cell. To this end, a CoMP transmission technique may be employed.

CoMP schemes applicable to downlink may be broadly classified into joint processing (JP) and coordinated scheduling/beamforming (CS/CB).

According to the JP scheme, data can be used by each point (eNB) of a CoMP cooperation unit. The CoMP cooperation unit refers to a set of eNBs used for a CoMP transmission scheme. The JP scheme may be further divided into joint transmission and dynamic cell selection.

Joint transmission refers to a technique of simultaneously transmitting PDSCHs from a plurality of points (a part or the entirety of a CoMP cooperation unit). That is, a plurality of points may simultaneously transmit data to a single UE. With the joint transmission scheme, the quality of a received signal may be coherently or non-coherently improved, and interference with other UEs may be actively eliminated.

Dynamic cell selection is a technique of transmitting a PDSCH from one point (of a CoMP cooperation unit) at a time. That is, one point transmits data to a single UE at a given time, while the other points in the CoMP cooperation unit do not transmit data to the UE at the given time. A point to transmit data to a UE may be dynamically selected.

Meanwhile, in the CS/CB scheme, CoMP cooperation units may cooperatively perform beamforming for data transmission to a single UE. Herein, user scheduling/beamforming may be determined through coordination among cells of a CoMP cooperation unit, whereas data is transmitted to the UE only from a serving cell.

In the case of uplink, CoMP reception refers to reception of a signal transmitted through cooperation among a plurality of geographically separated points. The CoMP schemes applicable to uplink may be classified into joint reception (JR) and coordinated scheduling/coordinated beamforming (CS/CB).

The JR scheme indicates that a plurality of reception points receives a signal transmitted through a PUSCH. The CS/CB scheme indicates that a PUSCH is received by only one point, but user scheduling/beamforming is determined by coordination among the cells of a CoMP unit.

With the CoMP system as above, multi-cell base stations may jointly support data for a UE. In addition, the base stations may simultaneously support one or more UEs using the same radio frequency resources, thereby increasing system performance. Moreover, a base station may perform space division multiple access (SDMA) based on CSI between the UE and the base station.

In the CoMP system, a serving eNB and one or more cooperative eNBs are connected to a scheduler over a backbone network. The scheduler may receive channel information about the channel states between each UE and cooperative eNBs measured and fed back by the cooperative eNBs over the backbone network, and operate based on the channel information. For example, the scheduler may schedule information for a cooperative MIMO operation for the serving eNB and the one or more cooperative eNBs. That is, the scheduler may directly issue a command about the cooperative MIMO operation to each eNB.

As described above, the CoMP system may be expected to operate as a virtual MIMO system by grouping a plurality of cells into one group. Basically, the CoMP system may adopt a MIMO communication scheme employing multiple antennas.

CoMP and CSI Process

Figure 10:
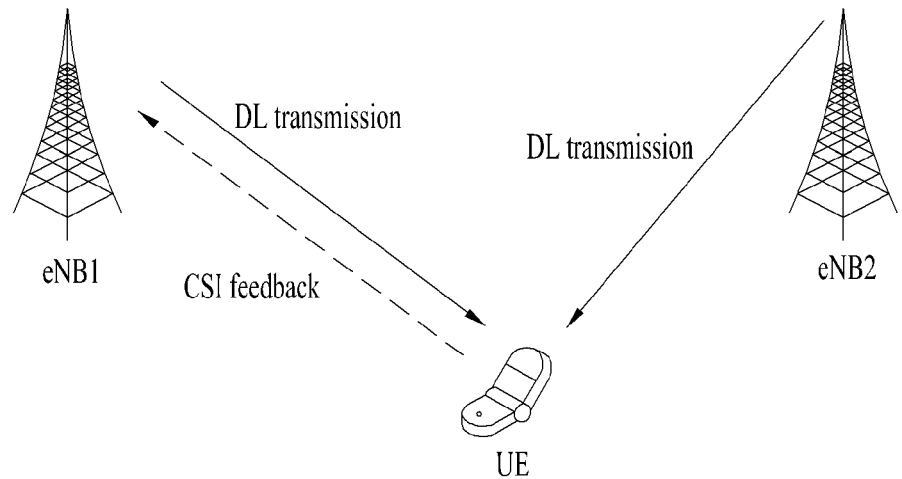
FIG. 10 illustrates an exemplary downlink CoMP operation.

FIG. 10 illustrates an exemplary downlink CoMP operation.

In FIG. 10, a UE is positioned between eNB1 and eNB2 and the two eNBs, i.e. eNB1 and eNB2, perform a proper CoMP operation such as joint transmission (JT), dynamic cell selection (DCS), or CS/CB to solve a problem of interference to the UE. To aid in the CoMP operation of the eNBs, the UE performs proper CSI feedback. Information transmitted through CSI feedback includes RI, PMI and CQI of each eNB and may additionally include channel information between the two eNBs (e.g. phase offset information between a channel from eNB1 to the UE and a channel from eNB2 to the UE) for JT.

While FIG. 10 illustrates the UE as transmitting a CSI feedback signal to eNB1 which is the serving cell thereof, the UE may transmit the CSI feedback signal to the eNB2 or to both eNBs depending on the situation.

That is, to support CoMP scheduling in a network, the UE may feed back not only downlink (DL) CSI of a serving eNB/TP but also DL CSI of a neighboring eNB/TP. To this end, the UE may generate and feed back CSI about a plurality of CSI processes reflecting various interference environments of eNBs/TPs for data transmission.

An interference measurement resource (IMR) is used to measure interference when CoMP CSI calculation is performed. One or more IMRs may be configured for a UE. Each IMR may be independently configured. That is, a period, subframe offset, and resource configuration (i.e., RE mapping location) may be independently set for each IMR, and information thereabout may be signaled from the network to the UE via a higher layer (e.g., an RRC layer).

A CSI-RS is used to measure a desired channel or signal for CoMP CSI calculation. One or more CSI-RSs may be configured for a UE. Each of the CSI-RSs is independently configured. That is, a transmission period, subframe offset, resource configuration (i.e., RE mapping location), assumption on transmit power (i.e., parameter Pc), and the number of APs may be independently configured for each CSI-RS and signaled from the network to the UE via a higher layer (e.g., an RRC layer).

One CSI process is defined by an association (combination) between one CSI-RS resource for signal measurement and one IMR for interference measurement from among the CSI-RSs and IMRs configured for the UE. The UE may feed back, to the network, CSI calculated or derived from different CSI processes according to the independent periods and subframe offsets. That is, each CSI process may have an independent CSI feedback configuration. The network may provide the UE with the information about the association (or combination) between a CSI-RS resource and an IMR and CSI feedback configuration through higher layer signaling (e.g. RRC signaling, etc.) according to each CSI process. For example, in FIG. 10, three CSI processes as shown in Table 4 may be configured for the UE.

TABLE 4

| CSI process | SMR | IMR |
| --- | --- | --- |
| CSI process 0 | CSI-RS 0 | IMR 0 |
| CSI process 1 | CSI-RS 1 | IMR 1 |
| CSI process 2 | CSI-RS 0 | IMR 2 |

In Table 4, CSI-RS 0 and CSI-RS 1 respectively represent a CSI-RS received from eNB1 which is a serving eNB of the UE and a CSI-RS received from eNB2 which is a neighboring eNB participating in cooperation.

Table 5 below shows configurations of the three IMRs of Table 4. IMR 0 is set as a resource on which eNB1 performs muting (or transmission of a null signal), and eNB2 performs data transmission. The UE measures interference from eNBs except for eNB1 on IMR 0. IMR 1 is set as a resource on which eNB2 performs muting, and eNB1 performs data transmission. The UE measures interference from the eNBs except for eNB2 based on IMR 1. IMR 2 is set as a resource on which both eNB1 and eNB2 perform muting. The UE measures interference from eNBs except for eNB1 and eNB2 based on IMR 2.

TABLE 5

| IMR | eNB1 | eNB2 |
| --- | --- | --- |
| IMR 0 | muting | data transmission |
| IMR 1 | data transmission | muting |
| IMR 2 | muting | muting |

In Table 4, CSI of CSI process 0 indicates optimum RI, PMI, and CQI given when data is received from eNB1. CSI of CSI process 1 indicates optimum RI, PMI, and CQI given when data is received from eNB2. CSI of CSI process 2 indicates optimum RI, PMI, and CQI given when data is received from eNB1 and there is no interference from eNB2.

Improvement of NIB CoMP

A non-ideal backhaul (NIB) network refers to a network that has a certain delay (of, for example, 5 to 30 ms) in signal transmission and reception on a backhaul link between geographically separated CoMP points. The legacy CoMP operation has been designed on the assumption of an ideal situation in which control information is communicated on a backhaul link between CoMP points without suffering a delay, and thus enables dynamic scheduling decision between CoMP points on a subframe-by-subframe basis. For example, a dynamic point switching (DPS) scheme in which a TP for transmitting PDSCH is changed in every subframe may be supported. For example, DL assignment of DCI format 2D is provided to the UE which is set to transmission mode10 (TM10) to support DPS, the 2-bit PQI field in DCI format 2D may be indicated by a specific status value. Thereby, PDSCH RE mapping information about a TP transmitting PDSCH and QCL information between RSs may be dynamically provided.

However, the legacy CoMP operation cannot be applied to a CoMP operation on the NIB network. For example, if a backhaul link between points participating in CoMP is an NIB, the PDSCH scheduling should be predetermined and shared between two points prior to delay in transmission and reception on the NIB in order for one point to inform of scheduling information about a PDSCH transmitted from the other point in a current subframe by providing the UE with DCI format 2D containing a PQI field in the subframe. This operation is close to static PDSCH scheduling according to a predetermined pattern rather than dynamic point selection. Accordingly, it is difficult to support the legacy CoMP operation on the NIB.

In this regard, the present invention proposes a method for correctly and efficiently performing or supporting CoMP on an NIB network Description given below mainly focuses on CoMP operation between eNBs, but the principle of the present invention may also be applied to CoMP operation between a TP, RP, remote radio head (RRH), and relay. That is, any of the terms eNB, TP, RP, RRH and relay encompasses all of the other terms.

Hereinafter, the present invention will be described based on a 3GPP LTE system, but the principle of the present invention is also applicable to a communication system based on another technology.

Xn-Signaling Information for NIB CoMP

Figure 11:
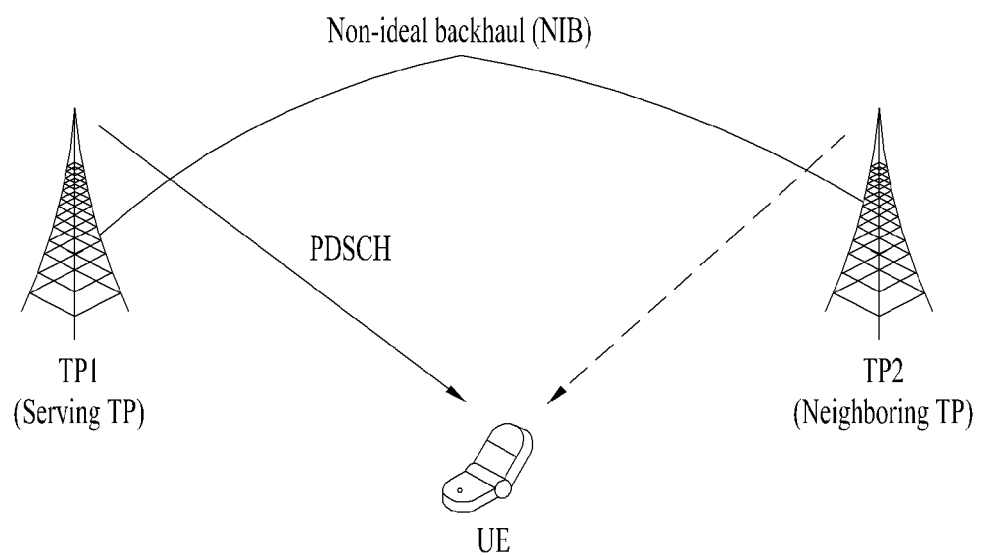
FIG. 11 illustrates a situation in which CoMP is not applied.

FIG. 11 illustrates a situation in which CoMP is not applied.

In FIG. 11, TP1 is the serving cell of the UE, and the UE receives DL scheduling information. The UE also receives a PDSCH from TP1.

In non-CoMP as shown in FIGS. 11, TP1 and TP2 may exchange signaling for cooperative transmission through an NIB link. Since signaling for cooperative transmission is transmitted on an Xn link (e.g., X2 link/backhaul link) referring to a link between TPs, it may have the form of Xn-signaling. In addition, the signaling for cooperative transmission may include at least one of loading information, information about one or more CSI-RS configurations, information about one or more CSI-IM (or IMR) configurations and DMRS configuration information.

The loading information (or congestion information) may include information about the number of UEs accessing a specific TP (i.e., UEs considering the TP as the serving cell thereof). Additionally or alternatively, the loading information may include information indicating a portion in use or a surplus portion of the serviceable capacity of the specific TP such as, for example, a ratio (percentage) of the number of UEs currently accessing the specific TP to the maximum number of UEs capable of accessing the specific TP. The specific TP may deliver such loading information to another TP through Xn-signaling or multicast/broadcast the same to a plurality of TPs. In addition, the specific TP may make a request for provision of such loading information to other TPs.

The information about one or more CSI-RS configurations may include NZP CSI-RS configuration information (e.g., NZP CSI-RS RE location, period, offset, etc.) about a specific TP and/or ZP CSI-RS configuration information (e.g., ZP CSI-RS RE location, period, offset, etc.) about the specific TP. The NZP CSI-RS configuration information may be related to one or more NZP CSI-RS configurations, an NZP CSI-RS which the TP is actually transmitting, or an NZP CSI-RS configured for a specific UE. The ZP CSI-RS configuration information may be related to one or more ZP CSI-RS configurations and be applied to PDSCH rate matching. A specific TP may deliver the information about one or more CSI-RS configurations to another TP through Xn-signaling, or multicast/broadcast the same to a plurality of TPs. In addition, the specific TP may make a request for provision of information about one or more CSI-RS configurations to other TPs.

The information about one or more CSI-IM (or IMR) configurations may include information about one or more CSI-IM configurations (e.g., ZP CSI-RS RE location, period, offset, etc.) of a specific TP and/or information about whether or not the specific TP performs muting (or transmission) with respect to each of the CSI-IM configurations at the corresponding RE location. The information about the CSI-RS configurations of the specific TP may include information about a CSI-IM configuration established for specific UEs by the specific TP and information about a CSI-IM configuration (e.g., ZP CSI-RS RE location, period, offset, etc.) which is not established for UEs associated with the specific TP but established for UEs of neighboring TPs to provide a specific interference environment in which the UEs calculate/generate CSI. The specific TP may deliver such information about one or more CSI-IM configurations to another TP through Xn-signaling or multicast/broadcast the same to a plurality of TPs. In addition, the specific TP may make a request to other TPs for provision of the information about one or more CSI-IM configurations. The specific TP may also make a request to other TPs for performing muting (or transmission) at an RE location of a specific CSI-IM configuration.

For the DMRS configuration information, there is a need to support Xn-signaling for pre-exchanging, between TPs, a DMRS configuration (e.g., DMRS sequence scrambling initialization parameters) to be applied if a TP transmits a PDSCH to each of UEs which are targets of CoMP transmission. For example, in a CoMP situation in which TP1 and TP2 are switched at different time intervals to transmit a PDSCH for the UE, TP2 needs to preannounce to TP1, through Xn-signaling, DMRS configuration information which TP2 uses to transmit a PDSCH to the UE. The UE can correctly perform PDSCH reception only when TP1 announces the DMRS configuration information to the UE through RRC signaling. This is because the latency of RRC signaling from TP1 to the UE may be greater than that of Xn-signaling between TP1 and TP2. Accordingly, if TP1 announces the DMRS configuration information pre-received from TP2 to the UE through RRC signaling, the UE may correctly receive the PDSCH from TP2 based on the DMRS configuration of TP2.

Herein, information about a specific CSI-IM configuration needs to be uniquely indicated within a network (e.g., a CoMP cluster) including a plurality of TPs. That is, for TP2 having received information indicating a specific CSI-IM configuration intended by TP1 to know the CSI-IM configuration intended by TP1 from the information, CSI-IM configuration information indicating a corresponding CSI-IM configuration needs to be predefined among the TPs. Accordingly, the present invention proposes that network-wise CSI-IM configuration information (hereinafter, NW-CSI-IM configuration information) be defined. For example, NW-CSI-IM configuration information may be defined by an NW-CSI-IM index (or NW-CSI-IM configuration index) to each CSI-IM configuration. The NW-CSI-IM configuration information may be communicated between TPs in the form of Xn-signaling.

For example, suppose that three eNBs construct one CoMP cluster. In this case, M NW-CSI-IM indexes may be defined. For example, 7 NW-CSI-IM indexes may be given as shown in Table 6 below.

TABLE 6

| NW-CSI-IM index | eNB1 | eNB2 | eNB3 |
| --- | --- | --- | --- |
| NW-CSI-IM index 1 | Muting | muting | muting |
| NW-CSI-IM index 2 | Muting | muting | non-muting |
| NW-CSI-IM index 3 | Muting | non-muting | muting |
| NW-CSI-IM index 4 | Muting | non-muting | non-muting |
| NW-CSI-IM index 5 | non-muting | muting | muting |
| NW-CSI-IM index 6 | non-muting | muting | non-muting |
| NW-CSI-IM index 7 | non-muting | non-muting | muting |

As shown in Table 6, the proposed NW-CSI-IM configuration information may directly indicate whether or not muting is to be performed for each specific eNB.

Table 6 is simply illustrative. Event cases marked by "non-muting" may be subdivided into a plurality of transmit power levels. In this case, M may be set to a value greater than 7. When NW-CSI-IM configuration information is defined in consideration of various interference hypotheses as above, M may be set to a value greater than 7. Alternatively, if only some cases are defined without considering all cases of muting of each eNB, M may be set to a value less than 7.

The NW-CSI-IM configuration information may not only indicate muting of each eNB (or a power level for non-muting) but also indicate that the behavior of a specific eNB does not matter. For example, the NW-CSI-IM configuration information may be defined as indicating "muting," "non-muting," or "don't care" for each eNB in the CoMP cluster. For example, NW-CSI-IM index 8 may be added to Table 6. Thereby, the NW-CSI-IM configuration information may be defined as shown in Table 7 below.

TABLE 7

| NW-CSI-IM index | eNB1 | eNB2 | eNB3 |
| --- | --- | --- | --- |
| NW-CSI-IM index 1 | muting | muting | muting |
| NW-CSI-IM index 2 | muting | muting | non-muting |
| NW-CSI-IM index 3 | muting | non-muting | muting |
| NW-CSI-IM index 4 | muting | non-muting | non-muting |
| NW-CSI-IM index 5 | non-muting | muting | Muting |
| NW-CSI-IM index 6 | non-muting | muting | non-muting |
| NW-CSI-IM index 7 | non-muting | non-muting | Muting |
| NW-CSI-IM index 8 | non-muting | don't care | Muting |

That is, in NW-CSI-IM index 8, the operation of eNB2 on the corresponding NW-CSI-IM resource may be set to "don't care". This means that eNB2 may determine, as eNB2 desires, whether to perform muting or non-muting on the corresponding NW-CSI-IM resource or precoding and power assignment applied to a signal to be transmitted when eNB2 performs non-muting. Accordingly, the other eNBs (e.g., eNB1 and eNB3) cannot predict the behavior that eNB2 performs on the corresponding NW-CSI-IM resource, it may not be ensured that interference caused by eNB2 is uniform.

As in the examples above, an Xn-signaling format (e.g., backhaul signaling format) explicitly indicating hypotheses of behaviors of individual eNBs on a specific CSI-IM resource may be designed, and CSI-IM configuration information may be exchanged between eNBs according to the Xn-signaling format. For example, each NW-CSI-IM index may be defined as explicitly indicating, for each eNB, one or more elements from a set including {muting, a predetermined maximum or minimum power level value, specific precoding information (e.g., a beam direction, a precoding coefficient, or a precoding set), "don't care"}, and backhaul signaling may be performed using a specific NW-CSI-IM index.

In addition, the NW-CSI-IM configuration information may be used in signaling between eNBs, or may be used as information about a CoMP hypothesis indicated to the UE by an eNB. For example, eNB1 may configure some (or all) of the NW-CSI-IM indexes 1, 2, 3 and 4 for UEs accessing eNB1 through a higher layer signal such as an RRC signal. For example, two NW-CSI-IM indexes of NW-CSI-IM index 4 (reflecting a non-CoMP interference environment) and NW-CSI-IM index 2 (reflecting a CoMP environment in which eNB2 performs muting) may be configured, through an RRC signal, for CoMP UE1 accessing eNB1, and NW-CSI-IM indexes 2 and 4 may be included in a separate CSI process. Thereby, CoMP UE1 may calculate/generate CSI based on different CoMP hypotheses (e.g., different interference environments) and feed the same back to eNB1. For example, for CoMP UE1, NW-CSI-IM index 4 may be configured as csi-IM-ConfigId-r11=1, and NW-CSI-IM index 2 may be configured as csi-IM-ConfigId-r11=2.

That is, one of {1, . . . , maxCSI-IM-r11} may be designated and set as a csi-IM-ConfigId-r11 value for individual UEs, and may correspond to the NW-CSI-IM index 1, . . . , 7 uniquely assigned on a network (e.g., a CoMP cluster).

As another example, eNB2 may configure some (or all) of NW-CSI-IM indexes 1, 2, 5 and 6 for UEs accessing eNB2 through a higher layer signal such as an RRC signal, and the UEs may calculate and feed back CSI in consideration of different CoMP environments corresponding to the NW-CSI-IM indexes.

In the examples above, methods to define information indicating a CSI-IM configuration network-wise have been mainly described. The same principle may also be applied to NZP CSI-RS configuration information and ZP CSI-RS configuration information. That is, by defining NW-NZP-CSI-RS configuration information (or an NW-NZP-CSI-RS index) and/or NW-ZP-CSI-RS configuration information (or an NW-ZP-CSI-RS index) in a specific-scale network (e.g., CoMP cluster) including a plurality of eNBs, a specific NW-NZP-CSI-RS configuration and/or specific NW-ZP-CSI-RS configuration may be uniquely designated for the eNBs (and UEs served by the eNBs) in the network.

Further, the concept of network-wise definition of information indicating a CSI-IM configuration may also be applied to CSI process configuration information. For example, one CSI process index may be defined as a combination of (one) NZP CSI-RS index and (one) CSI-IM index. That is, by defining NW-CSI-process configuration information (or an NW-CSI-process index) in a specific-scale network (e.g., a CoMP cluster) including a plurality of eNBs, a specific NW-CSI-process configuration may be uniquely designated for eNBs (and UEs served by the eNBs) in the network.

The aforementioned loading information, information about one or more CSI-RS configurations, information about one or more CSI-IM (or IMR) configurations, or DMRS configuration information may need to be pre-exchanged (or periodically exchanged) between TPs participating in a CoMP operation through, for example, Xn-signaling. That is, such information may need to be pre-exchanged between TPs participating in the NIB CoMP operation through, for example, Xn-signaling in order to use the information to determine when to initiate the CoMP operation (e.g., TP1 performs muting in a situation of loading of TP1 if possible) even if there is an Xn-signaling delay (of, for example, tens of milliseconds).

The loading information, information about one or more CSI-RS configurations, information about one or more CSI-IM (or IMR) configurations, or DMRS configuration information may not be limited to use during CoMP operation, but may also be used for other purposes, for example, to support the operation of a UE employing a network-assisted interference cancellation and suppression scheme.

Xn-Signaling for SSPM

Figure 12:
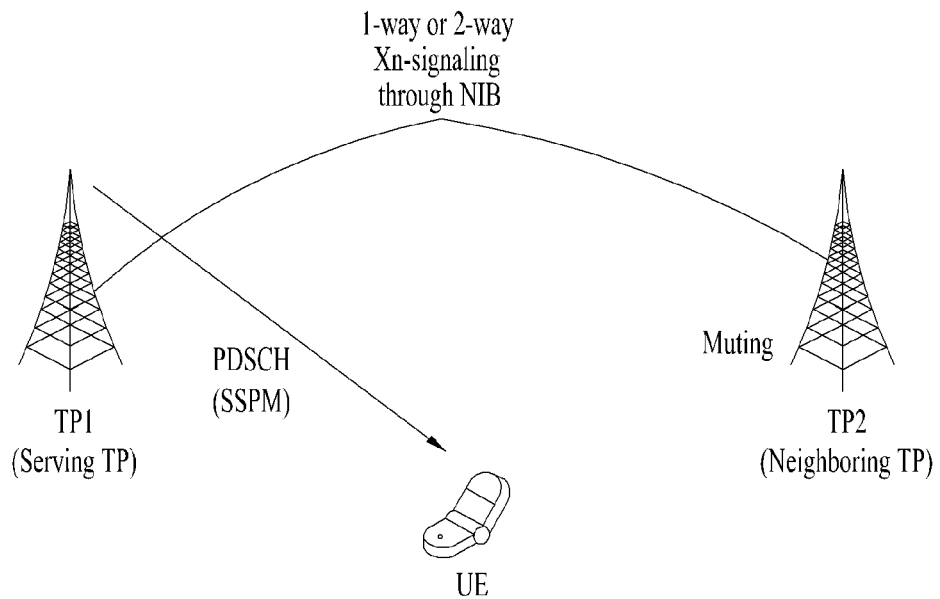
FIG. 12 illustrates an SSPM technique.

FIG. 12 illustrates an SSPM technique.

As a technique to use Xn-signaling between TPs to allow for NIB CoMP operation, semi-static point muting (SSPM) may be employed. Hereinafter, additional features of Xn-signaling which are considered for SSPM will be described.

SSPM is a scheme in which only a specific TP (e.g., serving TP1) transmits a PDSCH, and neighboring TPs performs muting in a predetermined band in a predetermined time interval. Information about the time interval and band in which the TPs perform muting may be pre-agreed between the TPs through Xn-signaling. According to the SSPM scheme in which neighboring TPs do not perform transmission in a specific band in a specific time interval, interference applied by the neighboring TPs may be minimized, and accordingly performance of receiving a PDSCH from a serving TP may be maximized in view of a CoMP UE.

1-Way Xn-Signaling for Initiation of SSPM

Xn-signaling for SSPM may be defined as being broadcast (unicast or multicast to one or more other TPs) by a specific TP in a 1-way manner.

The information provided by the TP transmitting the Xn-signaling may be a message for informing (promising) that the TP or other TPs will perform muting in a "specific band" in a "specific time interval".

Herein, the "specific time interval" may have a value expressed in a predetermined time unit (e.g., subframe). In addition, the "specific time interval" may be expressed as time information (e.g., continuous or discontinuous time information configured in the form of a subframe bitmap) indicating the time to start muting and the time after which muting ends based on a reference time clearly known to the TPs. In addition to the aforementioned subframe bitmap form, a time (e.g., a specific subframe index) at which the "specific time interval" starts or the number of cycles completed by the subframe bitmap before the "specific time interval" ends at a certain time (e.g., a specific subframe index) may be explicitly indicated.

To express such "specific time interval", a frame number (e.g., a system frame number (SFN)) at which a CoMP operation (muting/non-muting, etc.) is applied (or started) may be used. For example, the CoMP operation may be applied in a radio frame explicitly indicated by an SFN contained in Xn-signaling. In this case, the frame number (e.g., SFN) may be defined based on timing of a TP transmitting Xn-signaling. Alternatively, if the TP transmitting Xn-signaling is aware of information about timing of a TP receiving the Xn-signaling, the SFN value may be set to a value based on timing of the TP receiving the Xn-signaling and transmitted.

In addition, the "specific band" may be set to a value expressed in a predetermined frequency unit (e.g., RB unit).

2-Way Xn-Signaling for Initiation of SSPM

Xn-signaling for SSPM may be defined as 2-way signaling implemented in a manner that TP1 makes a request to TP2 for performing muting (i.e., resource coordination) and TP2 sends a response to TP1. In this case, the response message transmitted by TP2 may be delivered to TP1 and other TPs (e.g., TP3, TP4, . . . ) in a multicast/broadcast manner, or may be individually delivered to TP1 and other TPs by TP2 in a unicast manner.

Herein, the information contained in the request message transmitted by TP1 may be a message requesting that TP2 perform muting for a "specific band" in a "specific time interval".

For the "specific time interval" and "specific band", the same features of 1-way Xn-signaling for SSPM described above may be applied.

In this example, a "specific condition" for transmission of the request message from TP1 may be defined.

For example, TP1 may pre-provide configuration of a plurality of CSI processes for UEs associated therewith through RRC signaling (on the assumption that a delay greater than or equal to 100 ms may occur in RRC signaling), and continuously receive feedback for the respective CSI processes. Then, if a difference between CQIs fed back for different CSI processes becomes greater than or equal to a predetermined reference value, TP1 may transmit the request message. The plurality of CSI processes may include CSI process 1 and CSI process 2. For example, CSI process 1 may be configured by a combination of NZP CSI-RS 1 and CSI-IM1, which reflects a situation in which TP2 performs non-muting, and CSI process 2 may be configured by a combination of NZP CSI-RS1 and CSI-IM2, which reflects a situation in which TP2 performs muting. If the difference between CQI1 fed back for CSI process 1 and CQI2 fed back for CSI process 2 is greater than or equal to a predetermined reference value, this may mean that the condition for transmission of the request message is satisfied.

Such "specific condition" may also involve information about load between TP1 and TP2. For example, the request may be allowed only if the value of the load situation of TP2 is well below a predetermined reference value. Alternatively, if the value of the load situation of TP2 is greater than the predetermined reference value, TP2 may reject the delivered request.

The "specific condition" may be defined such that priorities are preset between the TPs (e.g., TP1 may be preset as a master, and TP2 may be preset as a slave), and thus when TP1 sends the request according to the priorities, TP2 must conform to the request.

If TP1 is pre-provided with information pre-confirming that TP2 will accept the request, through information such as the loading information, information about one or more CSI-RS configurations, information about one or more CSI-IM (or IMR) configurations, or DMRS configuration information, which is pre-exchanged through Xn-signaling, the SSPM operation may be initiated simply by a muting request for SSPM which TP1 sends to TP2 (namely, without a response from TP2).

If a specific condition for transmission of the request message is defined as above, and the request message is transmitted from TP1 as the condition is satisfied, TP2 receiving the request message may accept the request. The case in which TP2 should obey the request of TP1 if a specific condition is satisfied (or the case in which TP2 obeys the request without sending a response message to TP1) may be called conditional 1-way Xn-signaling.

Xn-Signaling During SSPM Operation

If SSPM is initiated through 1-way or 2-way Xn-signaling in a specific band in a specific time interval, SSPM may be defined as automatically ending when the time interval ends. Alternatively, the time interval may be extended through additional Xn-signaling (e.g., 1-way signaling or 2-way signaling) before the time interval ends. The information about the extended time interval may be updated with a new type of time information, and the band information may be updated with a new type of band information.

For example, CSI process 1 may be configured by a combination of NZP CSI-RS 1 and CSI-IM1, which reflects a situation in which TP2 performs non-muting, and CSI process 2 may be configured by a combination of NZP CSI-RS1 and CSI-IM2, which reflects a situation in which TP2 performs muting. In this case, before SSPM is initiated, TP1 may transmit a PDSCH to the UE through scheduling based on a feedback report on CSI process 1 from the UE (i.e., configuration of MCS1 based on CQI1). In the time interval in which SSPM is initiated, TP1 may transmit an SSPM-PDSCH to the UE through scheduling based on a feedback report on CSI process 2 from the UE (i.e., configuration of MCS2 (e.g., an MCS higher than MCS1) based on CQI2 in which muting of TP2 is reflected. In this way, the TP transmitting a PDSCH to the UE receives both feedback reports on CSI process 1 and CSI process 2, but may apply PDSCH scheduling based on CSI feedback information about a specific CSI process depending on whether or not the time interval is an SSPM interval.

Xn-Signaling for Feedback for SSPM

Xn-signaling for feeding back usage information about how much of the muting band of neighboring TPs the TP transmitting the SSPM-PDSCH has utilized to schedule a CoMP UE to transmit the SSPM-PDSCH may be additionally defined in or after the SSPM time interval.

For example, usage feedback information indicating the portion (e.g., percentage proportion) of resources which are used for scheduling for a UE (or CoMP UE) needing coordination between TSs participating in SSPM among the resources indicated by the coordination (e.g., resources defined by at least one of the frequency domain, time domain, power domain and space domain) may be exchanged between the TPs in the form of Xn-signaling. In addition, usage feedback information indicating the portion (e.g., percentage) of resources which are used for scheduling for a UE (or non-CoMP UE) that does not need coordination between the TSs participating in SSPM among the resources indicated by the coordination may be exchanged between the TPs in the form of Xn-signaling.

Xn-signaling may be defined such that the CoMP UE usage feedback information and non-CoMP UE usage feedback information are transmitted together. The proportion of the resources used for a UE (i.e., CoMP UE) having the benefit may be indicated among the resources indicated by the coordination between the TPs and the information may be used for the next SSPM resource configuration only when the CoMP UE usage feedback information and non-CoMP UE usage feedback information are provided together. Accordingly, by checking the usage information indicating whether time intervals and bands in which neighboring TPs perform muting are actually used for scheduling a corresponding CoMP UE, excessive consumption of muting resources may be prevented, and the corresponding resources may be utilized in performing data transmission to other UEs. Thereby, overall network performance may be enhanced.

CoMP Network Architecture and Xn-Signaling for Resource Coordination

In various examples of the present invention, one of a plurality of TPs participating in the CoMP operation or a specifically defined central control node (CCN) may perform coordination decision and deliver a coordination result (or resource coordination result). A coordination architecture having no CCN to control the TPs participating in the CoMP operation may be called a distributed coordination architecture, and a coordination architecture having a CCN may be called a centralized coordination architecture. For clarity, Xn-signaling is simply described as being performed between specific TPs in various examples of the present invention. The Xn-signaling may refer to Xn-signaling between TPs of the distributed coordination architecture or Xn-signaling between a CCN and a TP of the centralized coordination architecture.

Regarding the proposed details described in the Xn-signaling for SSPM, Xn-signaling for indicating the resource coordination request or resource coordination result may be designed to indicate specific indexes on a specific frequency-time resource basis (e.g., PRB basis and/or subframe basis) among NW-CSI-IM indexes known to a sender TP (or sender eNB) as shown in Table 8 below.

TABLE 8

| IE/Group Name | Semantics description |
| --- | --- |
| Indication of resource coordination (notice/result or request) | Per PRB (and/or per subframe index based on a subframe bitmap), NW-CSI-IM index(es) are listed, meaning the transmission assumptions (including transmitted power and/or precoding information) on the REs corresponding to the listed NW-CSI-IM indexes can be assumed to be the same on the indicated PRB (and/or subframe index). |

As shown in Table 8, semantics of the NW-CSI-IM indexes indicated through Xn-signaling may be interpreted as follows.

A sender eNB transmitting NW-CSI-IM indication information may inform receiver eNB(s) receiving the same that the NW-CSI-IM indication information is about a resource coordination notice/result, or a predetermined selector bit for informing of a resource coordination request may exist. For example, the NW-CSI-IM indication information may be interpreted as indicating a resource coordination notice/result or a resource coordination request depending on the value of the selector bit contained in the NW-CSI-IM indication information. Alternatively, the NW-CSI-IM indication information may be defined to be interpreted as information about a resource coordination notice/result if there is no separate indication (namely, to be interpreted, by default, as information indicating a resource coordination notice/result). In this case, to indicate that the NW-CSI-IM indication information is about a resource coordination request, special indication information needs to be included. (For example, the NW-CSI-IM indication information may be interpreted as indicating a resource coordination request if a specific field has a special value. Otherwise, the information may be interpreted as indicating a resource coordination notice/result). Alternatively, separate Xn-signaling formats may be designed for the resource coordination notice/result and the resource coordination request.

NW-CSI-IM Indication Information Indicating Resource Coordination Notice/Result

The NW-CSI-IM indication information may be interpreted as indicating that it can be assumed that the property (e.g., transmit power and/or precoding information) of a (interference) signal which a sender eNB transmits at an RE location (time/frequency resource location) set on NW-CSI-IM index(es) listed in the NW-CSI-IM indication information is the same as the property of a signal (e.g., PDSCH) that the sender eNB actually transmits on an indicated PRB and/or subframe index location.

This interpretation of the NW-CSI-IM indication information may be mainly applied to the distributed coordination architecture. For example, when the sender eNB transmits a signal in the form of information of one or more CSI-IM (or IMR) configurations as shown in Table 6 or 7 on a specific NW-CSI-IM resource through "non-muting", the sender eNB may notify the receiver eNB(s) that a signal property applied to the NW-CSI-IM resource is the same as the signal property applied to a specific frequency/time resource (or another frequency/time resource map). When other eNBs having received this notice information perform UE scheduling on a specific frequency/time resource indicated by the received information, they may determine or select a precoder, MCS and the like to be applied to DL transmission, based on the CSI feedback information provided by the UE for an NW-CSI-IM index that the sender eNB has signaled as information associated with the specific frequency/time resource.

In addition, if a receiver eNB receives NW-CSI-IM indication information from multiple sender eNBs through Xn-signaling with respect to a specific frequency/time resource map, the receiver eNB may determine specific NW-CSI-IM index(es) indicated in common as an intersection of NW-CSI-IM indexes indicated by the information provided by the sender eNBs. Thereby, CSI process indexes including the specific NW-CSI-IM indexes indicated in common may be determined, and the receiver eNB may receive a configuration of the CSI process indexes and consider the UE performing CSI feedback as a scheduling target. That is, given multiple eNBs set to "non-muting" for specific NW-CSI-IM indexes (e.g., NW-CSI-IM indexes 4, 6 and 7 in Table 6 or 7) to apply a specific signal on the corresponding resource, channel information recognized from a CSI feedback report which is based on the property of interference measured by the UE on the indicated NW-CSI-IM index(es) may become as similar to the channel state on a specific time/frequency resource used for UE scheduling as possible only when UE scheduling is performed for a specific time/frequency resource map on which NW-CSI-IM indication information has been received from as many eNBs as possible.

The NW-CSI-IM indication information may also be defined or configured to be transmitted to eNBs belonging to a specific eNB set (e.g., a CoMP cluster) in a multicast/broadcast manner. Herein, the specific eNB set may be predefined, or may be determined or configured through pre-negotiation between specific eNBs (or eNB sets) through separate Xn-signaling. That is, the NW-CSI-IM indication information may deliver IEs as shown in Table 8 through multicast/broadcast signaling directed to multiple eNBs belonging to a CoMP cluster rather than through unicast signaling sent to one receiver eNB. Thereby, the multiple eNBs receiving this information may indicate NW-CSI-IM indexes associated with each other to a frequency/time resource map as similar to the frequency/time resource map indicated by the sender eNB as possible in the best effort form and exchange the same sequentially (or in series) through Xn-signaling. Preferably, for example, for PRBs showing no noticeable difference in frequency selectivity, the receiver eNB having received the NW-CSI-IM indication information selects the same NW-CSI-IM indexes, if possible, with reference to the frequency/time resource map of the sender eNB that has provided the Xn-signaling first, and transmits Xn-signaling directed to other eNBs. For example, in Table 6 or 7, if eNB2 indicates "NW-CSI-IM indexes 3, 4 and 7" for a specific frequency/time resource map, eNB3 receiving the indexes conforms to a form as similar to the frequency/time resource map as possible (by, for example, configuring a frequency/time resource map such that as many frequency/time resources as possible overlap each other although some frequency/time resources may be the same or different), and indicate "NW-CSI-IM indexes 2, 4 and 6" to eNB1 through Xn-signaling. When eNB1 receives NW-CSI-IM indication information from eNB2 and eNB3, eNB1 may select NW-CSI-IM index 4 as an intersection between the information, and consider a UE for which a specific CSI process including the selected index is configured as a scheduling target first.

In addition, regarding the frequency/time resource map, it may be effective to pre-divide a CoMP-allowed region and a CoMP-disallowed region through separate Xn-signaling and align CoMP-allowed regions of the eNBs as much as possible through negotiation between the eNBs. That is, the eNBs may predetermine a specific frequency/time resource to which CoMP is not applied, in consideration of a guaranteed bit rate (GBR) bearer, and pre-exchange this information to utilize the information in pre-negotiating the CoMP-allowed regions. More specifically, a subset of eNBs greatly affecting a CSI-IM resource for each NW-CSI-IM index may be pre-constructed/pre-configured for each NW-CSI-IM index (for example, a subset may be pre-constructed/pre-configured with eNBs that geographically neighbor each other), and negotiation for alignment of the frequency/time resource map may be mainly performed between eNBs. For example, even if Xn-signaling for the negotiation for the frequency/time resource map is multicast/broadcast to a specific eNB set such as the CoMP cluster, eNBs having higher priorities as negotiation targets may be separately designated.

To allow the operations above to be smoothly performed, Xn-signalings should avoid overlapping each other within a specific eNB set such as the CoMP cluster as described above. To this end, the eNBs in the specific eNB may take turns sequentially (serially) to transmit Xn-signaling according to a pre-defined or pre-configured period and/or offset.

NW-CSI-IM Indication Information Indicating Resource Coordination Request

The NW-CSI-IM indication information may be interpreted as requesting that the property (e.g., transmit power and/or precoding information) of a (interference) signal which a receiver eNB transmits at an RE location (time/frequency resource location) set on NW-CSI-IM index(es) listed in the NW-CSI-IM indication information should be the same as the property of a signal (e.g., PDSCH) that the receiver eNB actually transmits on an indicated PRB and/or subframe index location.

In the case where the NW-CSI-IM indication information indicates a resource coordination request, the sender eNB used in the case where the NW-CSI-IM indication information indicates a resource coordination notice/result is switched to the receiver eNB. In addition, the proposed examples of the case of the NW-CSI-IM indication information indicating a resource coordination notice/result may be applied as examples of the case of the NW-CSI-IM indication information indicating a resource coordination request by switching the sender eNB to the receiver eNB and vice versa.

Additionally, once the receiver eNB receives the NW-CSI-IM indication information indicating a resource coordination request, the receiver eNB may send a response message through signaling indicating acceptance or rejection of the request.

The response message may simply indicate acceptance or rejection, but the intention of acceptance or rejection may be delivered using another method.

For example, Xn-signaling for "Rejected" may be replaced by the NW-CSI-IM indication information indicating the resource coordination notice/result. In this case, the receiver eNB having received the resource coordination request may be understood as delivering, to the sender eNB having transmitted the resource coordination request, a resource coordination notice/result indicating "Rejected" for the request and reconfigured in a different form by the receiver eNB through Xn-signaling.

Xn-signaling for "Accepted" may be configured to include a case where the receiver eNB does not transmit response signaling to the sender eNB (namely, a response is omitted). That is, if the sender eNB sends NW-CSI-IM indication information indicating a resource coordination request to the receiver eNB through Xn-signaling, the request may be defined or configured to be accepted by default as long as there is no separate response from the receiver eNB. This operation may be effectively utilized in the centralized coordination architecture. For example, when a CCN (or a specific eNB (e.g., Macro-eNB) serving as a CCN; hereinafter, referred simply to as CCN) delivers NW-CSI-IM indication information indicating a resource coordination request to other eNBs through Xn-signaling, a receiver eNB receiving the information may be configured not to signal a response message or configured to signal a response message indicating "accepted" depending on the type of the sender eNB (e.g., only if the sender eNB is a CCN or macro-eNB). In this case, the Xn-signaling transmitted from the sender eNB takes the form of a resource coordination request, but substantially functions as a command for resource coordination. Thereby, a centralized coordination architecture including a sender eNB (e.g., a CCN) and other receiver eNBs (e.g., non-CCNs) may be configured.

In a distributed coordination architecture, on the other hand, if a receiver eNB having received NW-CSI-IM indication information indicating a resource coordination request sends a response message indicating acceptance of the request, the sender eNB having transmitted the NW-CSI-IM indication information indicating the resource coordination request may determine or select a precoder, MCS and the like to be applied to DL transmission, based on the CSI feedback information about a specific NW-CSI-IM index associated with a specific frequency/time resource provided by a corresponding UE when the sender eNB scheduling the UE on the specific frequency/time resource indicated by the NW-CSI-IM indication information.

Centralized Coordination Architecture Xn-Signaling

Hereinafter, a benefit metric will be described as additional Xn-signaling which can be advantageously used in various examples proposed in the present invention, in particular, a centralized coordination architecture. The benefit metric may be a UE scheduling metric or utility metric of a specific frequency/time resource map sent from each eNB to the CCN. In the description below, the term utility metric will be mainly used, but this term should be understood as a term representing UE scheduling metric or benefit metric.

A utility metric may be defined as a value for the data rate or throughput that may be expected when a specific UE is scheduled on a specific frequency/time resource (e.g., a resource defined on the PRB and/or subframe index basis). For example, the utility metric may be defined as a value obtained by dividing a data rate (or throughput) expectable for a specific UE by the average data rate (or average throughput) of the UE. In addition or alternatively, the utility metric may be defined as a value for a data rate (or throughput) expectable for a specific UE that is derived in consideration of QoS of the UE (e.g., a value calculated according to a specific function predefined or pre-configured according to QoS of the UE).

For example, if the utility metric value increases, this may mean that performing UE scheduling on the corresponding frequency/time resource is advantageous to the eNB. Accordingly, if a sender eNB sends such utility metric to a CCN through Xn-signaling, this may be interpreted as meaning that the sender eNB provides the CCN with information indicating that the sender eNB prefers performing data (e.g., PDSCH) transmission to performing muting on a frequency/time resource having a high utility metric value.

A plurality of utility metrics may be sent for a specific frequency/time resource through Xn-signaling. In this case, each utility metric may have a value calculated on the assumption of different CoMP hypothesis. Herein, the different CoMP hypothesis may mean a different interference environment, may be defined as a pattern indicating whether or not muting is performed by each eNB, or may mean a different CSI process unit.

As a method to express different CoMP hypotheses that the sender eNB assumes through Xn-signaling, the format of one or more CSI-IM (or IMR) configurations information as shown in Table 6 or 7 may be employed. For example, a utility metric value may be calculated for each "NW-CSI-process index" and sent through Xn-signaling, or may calculated for each "NW-NZP-CSI-RS index and/or NW-CSI-IM index" and sent through Xn-signaling.

For example, a utility metric value may be calculated and sent through Xn-signaling on the assumption of data (e.g., PDSCH) transmission based on CSI feedback of a corresponding UE per specific frequency/time resource (e.g., PRB and/or subframe index) according to specific NW-CSI-process index(es), as shown in Table 9 below.

TABLE 9

| IE/Group Name | Semantics description |
| --- | --- |
| Utility metric (or UE scheduling metric, or benefit metric) | Per PRB (and/or per subframe index based on a subframe bitmap), pair(s) of {utility metric(U bits), NW-CSI-process index(es)} are listed, meaning the utility metric value is calculated assuming the (PDSCH) transmission based on the CSI feedback according to the indicated NW-CSI-process index). |

As shown in Table 9, a utility metric may have the size of U bits, and a pair of a utility metric and NW-CSI-process index(es) may be Xn-signaled.

Another utility metric calculated on the assumption of different NW-CSI-processes may also be Xn-signaled. That is, as shown in Table 9, one pair or a plurality of pairs of {utility metric, NW-CSI-process index(es)} may be Xn-signaled.

As one NW-CSI-process index is configured by a combination of one NW-NZP-CSI-RS index and one NW-CSI-IM index, calculating a utility metric for each NW-CSI-process index may mean that a channel (or desired signal) is measured based on the NW-NZP-CSI-RS indicated by a NW-CSI-process index, interference is measured based on the NW-CSI-IM indicated by the NW-CSI-process index, and a utility metric is calculated assuming that a PDSCH is transmitted based on CSI feedback information (e.g., RI, PMI, and CQI) calculated/generated based on the results of the measurements.

A CCN may receive Xn-signaling containing such utility metric from multiple eNBs, and perform global optimization within a specific eNB set (e.g., CoMP cluster) including the eNBs, based on all the received information. Thereby, NIB CoMP operation may be efficiently performed by transmitting the eNBs Xn-signaling containing information indicating a resource coordination request from each eNB (e.g., Xn-signaling containing NW-CSI-IM indication information indicating a resource coordination request (which is substantially a resource coordination command)).

For example, if the CCN selects the highest utility metric value for a specific frequency/time resource as a resource coordination result, the CCN may recognize specific NW-CSI-IM index(es) associated with corresponding NW-CSI-process index(es) because the CCN is already aware of the NW-CSI-process index(es) forming the basis of calculation of the selected utility metric (i.e., a pair of {utility metric, NW-CSI-process index(es)} shown in Table 9). Thereby, the CCN may configure Xn-signaling in the form of NW-CSI-IM indication information indicating a resource coordination request (or resource coordination command) and transmit the same to the eNBs.

As described above, in the Table 9, the "NW-CSI-process index(es)" may be replaced by "NW-NZP-CSI-RS index(es) and/or NW-CSI-IM index(es)". In this case, a utility metric IE may be defined as shown in Table 10 below.

TABLE 10

| IE/Group Name | Semantics description |
| --- | --- |
| Utility metric (or UE scheduling metric, or benefit metric) | Per PRB (and/or per subframe index based on a subframe bitmap), pair(s) of {utility metric(U bits), NW-NZP-CSI-RS index(es) and/or NW-CSI-IM index(es)} are listed, meaning that the utility metric value is calculated assuming the (PDSCH) transmission based on the CSI feedback according to the indicated NW-NZP-CSI-RS index(es) and/or NW-CSI-IM index(es). |

The embodiment employing Xn-signaling for a utility metric IE defined in Table 9 may be applied as an embodiment employing "NW-NZP-CSI-RS index(es) and/or NW-CSI-IM index(es)" in place of "NW-CSI-process index(es)" in Table 8.

Specifically, this may mean that each eNB measures a channel (or desired signal) based on the indicated NW-NZP-CSI-RS, measures interference based on the indicated NW-CSI-IM, and calculate a utility metric assuming that a PDSCH is transmitted based on CSI feedback information (e.g., RI, PMI, and CQI) calculated/generated based on the results of the measurements.

Alternatively, in the example of Table 9, Xn-signaling may be configured in the form of one or more pairs of {utility metric (U bits), NW-CSI-IM index(es)}, omitting the information indicating the NZP-CSI-RS index(es). In this case, the NW-NZP-CSI-RS index(es) forming the basis of calculation of the utility metric may be interpreted as being separately signaled by the sender eNB transmitting the utility metric, and the specific NW-NZP-CSI-RS index(es) being configured/transmitted by the sender eNB may be interpreted as being implicitly indicated.

Xn-Signaling of Information Similar to Utility Metric

In place of the Xn-signaling operation for a utility metric (or UE scheduling metric, or benefit metric) described in the examples above, Xn-signaling of other similar information (e.g., preference rating or priority map) may be applied. Hereinafter, a detailed description will be given of the utility metric, preference rating and priority map.

As described above, the utility metric is defined as a value indicating a data rate (or throughput) that is expectable when a specific UE is scheduled on a specific frequency/time resource (e.g., PRB unit and/or subframe index unit). Further, a calculated value of the utility metric may be expressed as a value mapped to the calculated value according to a predefined quantization reference. However, the eNB may be differently implemented among network venders, and thus it is very likely that the calculation methods for the utility metric for the eNBs are not identical to each other. If a network operator configures a CoMP cluster including eNBs implemented by different network vendors, utility metric values calculated and Xn-signaled by the respective eNBs may be values expressed by different references, and it may be impossible to compare the values. Accordingly, a comparison reference similar to but simpler than the utility metric may be used.

The preference rating or priority map may be configured as a simplified level (e.g., defined as indicating one of four levels) in contrast with the utility metric. Similar to the utility metric described in Table 9 or 10, the preference rating or priority map may be paired with an NW CSI index. Specifically, one or more pairs of {preference rating (or priority map), NW-CSI-process index(es)}, one or more pairs of {preference rating (or priority map), NW-CSI-IM index(es)}, or one or more pairs of {preference rating (or priority map), NW-NZP-CSI-RS index(es) and/or NW-CSI-IM index(es)} may be listed in Xn-signaling.

The preference rating (or priority map) does not need a metric which depends on a scheduler algorithm which may change according to an implemented eNB, and may be utilized to express a simplified preference or priority. In expressing the preference or priority, the preference or priority may be utilized in a CoMP cluster as a value comparable between eNBs implemented by different network vendors by allowing the network operator rather than the value network vendor to insert the same in a software-based algorithm.

The sender eNB sends signaling such as the utility metric, UE scheduling metric, benefit metric, preference rating, and priority map to inform other eNBs of utility/benefit/preference of the sender eNB assuming a specific CoMP hypothesis (i.e., operation of each eNB (e.g., muting, transmission assumptions, etc.) in a CoMP cluster) indicated by an NW-CSI-process index (or NW-CSI-IM index). This operation may be interpreted as informing other eNBs of an operation that is preferable in view of the sender eNB when the specific CoMP hypothesis is applied.

The proposed signaling such as the utility metric, UE scheduling metric, benefit metric, preference rating, and priority map is clearly different from the conventional inter-eNB signaling in that the sender eNB informs of not only the operation thereof but also operations of other eNBs in the CoMP cluster (i.e., operations of other eNBs which the sender eNB determines to be preferable in terms of optimization of network performance and/or operations of other eNBs which the sender eNB desires), rather than conforming to a basic principle of signaling between eNBs in the conventional art (i.e., the principle stating that the sender eNB informs other eNBs of only the operation thereof and is not involved in operations of the other eNBs).

Xn-Signaling of Utility Metric Information

In addition to or in place of Xn-signaling the utility metric as shown in Table 9 or 10, element information for calculating the utility metric may be exchanged between eNBs through Xn-signaling on the frequency/time resource basis. In the centralized coordination architecture, element information for calculating the utility metric may be designed to be transmitted from eNBs to the CCN.

The element information may include at least one of the following examples:

- One or more sets of CSI reports (e.g., RI, PMI, CQI) of UEs to be scheduled
- One or more sets of measurement reports (e.g., RSRP) of UEs to be scheduled
- Sounding reference signal (SRS) reception power of UEs to be scheduled
- User perceived throughput; UPT of UEs to be scheduled
- Proportional fair (PF) metric of UEs to be scheduled
- QoS class identifier (QCI) of UEs to be scheduled.

In the examples above, the "UEs to be scheduled" may be defined or configured to be interpreted as meaning that information about specific UEs, which the eNB desires to schedule on a corresponding frequency/time resource, is included in the element information. That is, this operation may be understood as delivering the element information about the best UE or representative UE to the receiver eNB rather than delivering the element information about all individual UEs served by the sender eNB. Thereby, Xn-signaling overhead may be significantly reduced. In addition, overall optimization may be readily performed in the CoMP cluster even if element information about only some UEs is collected by the CCN.

More specifically, in the examples above, the "UEs to be scheduled" may be interpreted as "a set of (active) UEs". This may be interpreted as meaning that element information about all active UEs is signaled or that element information about some of active UEs (which may be selected by the sender eNB) is signaled.

Even if element information about some UEs is signaled, the minimum number of UEs in the "set of UEs" may be set to 1. That is, the sender eNB may be defined to signal element information about at least one UE. For example, when it is requested or indicated according to the Xn-signaling protocol (by, for example, a predetermined invoke message) that the element information as above should be transmitted, or when the sender eNB attempts to transmit the element information through inter-eNB Xn-signaling for the first time, the minimum number of UEs in the "set of UEs" may be set to 1.

Alternatively, the minimum number of UEs in the "set of UEs" may be allowed, on the Xn-signaling protocol, to be set to 0 according to the type of the element information. For example, the minimum number of UEs belonging to UEs (i.e., "a set of UEs") to be scheduled in "one or more sets of CSI reports (e.g., RI, PMI, CQI) of UEs to be scheduled" may be defined to be 1, and the minimum number of UEs belonging to UEs (i.e., "a set of UEs") to be scheduled in "one or more sets of measurement reports (e.g., RSRP)" may be defined to be 0. This may be interpreted as meaning that CSI information about at least one UE needs to be provided to another eNB, but RSRP information may be optionally provided in performing Xn-signaling for element information. Alternatively, if RSRP information is not provided, (i.e., RSRP information about zero UE is provided), this may mean that the previously provided RSRP information about specific UEs does not change, and thus the corresponding value is not updated.

In addition, the UEs belonging to the "UEs to be scheduled" or "set of UEs" may be selected from among UEs satisfying minimum requirements. For example, CoMP configurable UEs (e.g., UEs set to transmission mode 10 or a higher mode), UEs for which two or more CSI processes are configured, or UEs for which the maximum number of CSI processes which are supportable according to UE capability information is greater than or equal to 2 may be defined to be included in the "set of UEs".

In addition to the examples of element information related to the utility metric, transmission buffer information (e.g., "Status of transmission queues") may be Xn-signaled.

The status of transmission queues information may be used to minimize delay in packet delivery. For example, as the length of a queue increases, the utility metric value may increase. For example, by Xn-signaling the length information about a transmission queue of an eNB, a CCN may assign a high utility metric value if the CCN determines that the queue is long (this may mean that a maximum delay scheduling algorithm is applied).

The sender eNB may transmit the status of transmission queues information through Xn-signaling at intervals of T ms. In this case, the status of transmission queues may include one of the following pieces of information at a specific time:

Information indicating a current transmit buffer status for each specific UE;
Information indicating the amount of data (number of packets) that has been scheduled since the previous Xn-signaling time (e.g., the time before T ms);
Information indicating the amount of new data (number of packets) that has been additionally stacked in the buffer since the previous Xn-signaling time (e.g., the time before T ms);
Information indicating queue status accumulated in the transmission queue up to the current time.

Using one or more of the information, a network node (e.g., CCN) receiving Xn-signaling of the information may recognize the amount of data stacked in the sender eNB transmitting the information, and assign a higher weight to an eNB in which a larger amount of data is stacked at the time of resource coordination/assignment.

Meanwhile, in the "integrated Xn-signaling" described below, Xn-signaling information referred to as "benefit metric" or "preference rating value" may include "transmit buffer and queue status information". The examples included in the "status of transmission queues" information described above may be defined or configured to be transmitted in the form of "transmit buffer and queue status information". For example, in the "transmit buffer and queue status information", the "transmit buffer status" information may mean "information indicating current transmit buffer status for each specific UE", and the "queue status" information may mean "information indicating the queue status accumulated in the transmission queue up to the current time". As such, some or a combination of a plurality of specific examples of the "status of transmission queues" may be transmitted through Xn-signaling as content of a message for delivering various kinds of buffer status-related information.

Additional Example 1 of Inter-NIB CoMP eNB Signaling

The following information may signaled on an Xn interface (e.g., X2 interface) between eNBs for NIB CoMP:

CoMP hypothesis. The CoMP hypothesis may include hypothetical resource allocation for at least a receiver node in the time/frequency;
One or more sets of CSI information (RI, PMI, CQI) about a set of UEs;
One or more measurement reports (RSRP) on a set of UEs;
Improved RNTP (Enhanced Relative Narrowband Tx Power). The information configuration granularity of the improved RNTP may be extended in the frequency/time domain. In addition, information in the improved RNTP may include a transmit power threshold only for a sender eNB, and be configured in multiple levels. To exchange the utility status of an indicated frequency/time resource, the conventionally defined status report may be signaled between eNBs;
Benefit metric.

Hereinafter, details that need to be specifically defined in the Xn-signaling information will be described.

CoMP Hypothesis

The CoMP hypothesis includes hypothetical resource allocation for at least a receiver node in the time/frequency domain, which is intended to support centralized coordination. Signaling of such CoMP hypothesis may be used to indicate the result of resource coordination determined by a CCN, or may be used as a hypothetical condition assumed for benefit metric signaling (without a time/frequency configuration granularity).

How to respond to the received CoMP hypothesis signaling depends on implementation of the receiver eNB, or the receiver eNB may send the transmitter node feedback (e.g., YES/NO) indicating acceptance/rejection of the hypothesis.

The configuration granularity and signaling period of a time/frequency domain necessary for the CoMP hypothesis may be set on the PRB and subframe basis and be indicated by an L-bit subframe. In consideration of different NIB delay and signaling periods, it is proposed that the maximum value of L be 10. A proper signaling period L for the CoMP hypothesis may differ between sender nodes, and accordingly the value of L may be included in the CoMP hypothesis signaling information, or the receiver node may request the period value (i.e., the L value). The CoMP hypothesis information may include cell-specific power assignment information (information indicating whether or not muting is performed, information indicating a power level, or the like) and be identified by a cell ID.

Benefit Metric Associated with CoMP Hypothesis

The benefit metric may be defined as follows.

The benefit metric, which is associated with the CoMP hypothesis, is information quantifying the benefit that a cell of the sender node expects in performing scheduling on the assumption of the associated CoMP hypothesis.

The cell-specific benefit metric is calculated as the maximum value in the result of a function that the operation defines from element information given for each of active UEs in the corresponding cell. The element information may be a CSI report (RI, PMI, CQI) set, one or more measurement reports (RSRP), average user throughput, transmit buffer and queue status information, and QCI that correspond to the associated CoMP hypothesis.

Figure 13:
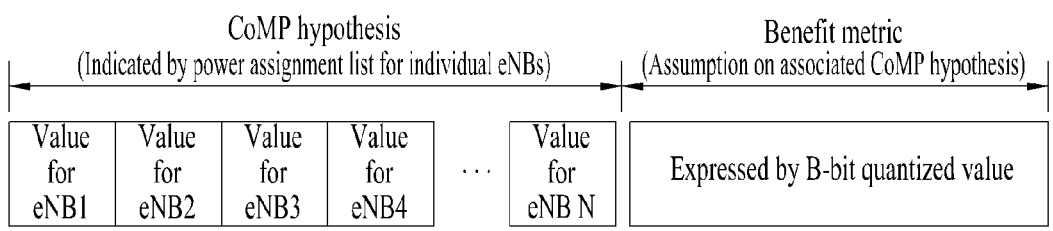
FIG. 13 illustrates a benefit metric signaled together with a CoMP hypothesis for a frequency/time resource map.

FIG. 13 illustrates a benefit metric signaled together with a CoMP hypothesis for a frequency/time resource map.

In FIG. 13, the CoMP hypothesis may be indicated by a power assignment list for individual eNBs. The power assignment list may be configured to explicitly indicate the power assignment value for eNB1, the power assignment value for eNB2, . . . , and the power assignment value for eNB N. Alternatively, the CoMP hypothesis may be indicated in a simpler form such as an NW CSI-IM index. That is, one index value may indicate operation of individual eNBs.

The benefit metric may be signaled together with the associated CoMP hypothesis without a time/frequency configuration granularity. Specifically, the signaled benefit metric means a quantized benefit value which the cell of the sender node expects in performing scheduling on the assumption of the associated CoMP hypothesis (e.g., a muting/non-muting pattern of a neighboring cell).

The sender node may signal a plurality of benefit metrics, and each of the benefit metrics is associated with a different CoMP hypothesis. Thereby, each benefit metric may represent preference rating of a corresponding CoMP hypothesis (information indicating not only operation of the sender eNB but also operations of the other eNBs) in view of the sender eNB.

As the benefit metrics are signaled together with CoMP hypotheses, the transmission period of the benefit metrics may be configured to be equal to the transmission period (e.g., period value L) of the CoMP hypotheses.

The information of a benefit metric may be defined as an integer value between 0 and B (B>0). As the benefit metric is defined as a quantized value considering all active UEs in a cell, B may be set to 100, for example. As a simple example, a PF metric derived from at least one CSI report set and average user throughput corresponding to an associated CoMP hypothesis may be used to calculate the benefit metric. Herein, one or more measurement reports (RSRP) may also be used to calculate CQI. Since the CQI is calculated not by a CCN but by a sender eNB, QCI or additional information such as transmit buffer and queue status information may be used. When benefit metrics associated with different CoMP hypotheses reach the CNN from a plurality of sender nodes, the CCN may use all the information provided from member eNBs to determine resource coordination. If determination of resource coordination is provided from the CCN to the member eNBs, the benefit metrics may not need to be signaled. That is, since the CCN functions to determine resource coordination in consideration of benefit metrics expected by the member eNBs, benefit metrics expected by the CCN do not need to be provided to the member eNBs. If signaling transmitted from a member eNB to the CCN and signaling transmitted from the CCN to the member eNB are defined in an "integrated signaling format," which will be described later, the benefit metric information may be set to a special value indicating that the signaling is a notice/command type of resource coordination decision which the CCN transmits to the member eNB, may be omitted, or may be reserved.

Signaling of CoMP hypotheses and benefit metrics as above may be applied not only to the centralized coordination architecture but also to the distributed coordination architecture. For example, in the distributed coordination architecture, when eNB1 is a sender and eNB2 is a receiver, the benefit metric signaling may be understood as resource coordination request (or resource coordination recommendation) signaling given considering the indicated CoMP hypothesis in view of eNB1. In this case, eNB2 may consider information received from eNB1 in determining scheduling thereof. Specifically, eNB2 may consider that the information about operation of the sender eNB1 is guaranteed to be applied to eNB1 later. Thereby, the receiver eNB2 may utilize a CSI feedback report of a relevant UE. The information about the operation of the receiver eNB2 may be considered when eNB2 operates in a best effort manner.

In the distributed coordination architecture, lots of such signaling may be exchanged, and thus the receiver eNB2 may also consider information about operation of other eNBs in performing scheduling thereof. For example, the most commonly preferred CoMP hypothesis (i.e., a CoMP hypothesis to which a large number of eNBs has assigned a higher benefit metric value than to the other CoMP hypotheses) may be used as an assumption on final scheduling decision of the receiver eNB2.

CSI and RSRP Information

One or more sets of CSI information and/or RSRP information about a set of UEs may be Xn-signaled for CoMP operation in both the centralized coordination architecture and the distributed coordination architecture. The aforementioned cell-specific benefit metric does not include explicit UE-specific information such as CSI reported together with UE identification information (ID) and NW-CSI-process identification information (ID) assumed for the CSI, and therefore this type of information may be used for CoMP as additional information based on signaling of the benefit metric information. For example, if CSI information including PMI of UEs to be scheduled by the sender eNB is provided to other eNBs, the receiver eNB may consider CoMP operation including coordinated beamforming (CB) based on the CSI information.

Since signaling of UE-specific information as above causes large overload for Xn-signaling between eNBs, element information such as QCI, buffer status and average user throughput may not be simultaneously Xn-signaled. Accordingly, the UE-specific signaling may be treated as supplementary or optional information.

Improved RNTP

Signaling of an improved RNTP is recognized as a notice of operation of the sender eNB related to power level and/or beamforming information of the sender eNB on an indicated frequency/time resource map, and thus the distributed coordination architecture may be supported by NIB CoMP. In contrast with existing RNTP/ABS (almost blank subframe) signaling, the resource configuration granularity is extended to the two-dimensional domain of a frequency-time resource map, multi-level power assignment information is indicated, and indication information (e.g., precoding information) in the space domain is included in signaling.

The improved RNTP may include a transmit power threshold and a frequency/time domain 2-dimensional bitmap. Each bit of the 2-dimensional bitmap may indicate that a power level below the threshold is or is not guaranteed. The resource configuration granularity may be defined as an RB unit in the frequency domain and as a subframe unit in the time domain. For a 2-dimensional resource map, bitmaps for K RBs and L subframes may be designed as a K-bit bitmap and an L-bit bitmap. In this case, the K-bit bitmap may be valid only in subframes indicated in the L-bit bitmap (e.g., subframes corresponding to bits set to 1). Using only one power threshold, rather than using multi-level power thresholds, may be sufficient.

Integrated Xn-Signaling

Signaling indicating a result/notice/request/recommendation/command for interference coordination mentioned in the description of "NW-CSI-IM Indication Information Indicating Resource Coordination Notice/Result" and "NW-CSI-IM Indication Information Indicating Resource Coordination Request" may be designed in one integrated Xn-signaling format. Hereinafter, the integrated signaling format will be referred to as a CoMP coordination CSI-IM map, namely CCC map. Table 11 shows an example of the CCC map.

TABLE 11

| IE/Group Name | Semantics description |
| --- | --- |
| CoMP Coordination CSI-IM map; CCC map | Per PRB (and/or per subframe index based on a subframe bitmap), NW-CSI-IM index(es) are listed, meaning the transmission assumption for the sender eNB (including transmitted power and/or precoding information) on the REs corresponding to the listed NW-CSI-IM indexes can be assumed to be the same on the indicated PRB (and/or subframe index), and the transmission assumptions for other eNBs within the CoMP cluster (including transmitted power and/or precoding information) on the REs corresponding to the listed NW-CSI-IM indexes are (highly) recommended to be assumed to be the same on the indicated PRB (and/or subframe index). |

The integrated CCC map as shown in Table 11 indicates operations of a sender eNB, a receiver eNB and other eNBs in a CoMP cluster all together. That is, in the CCC map, transmission assumption of each eNB (transmit power (including execution of muting) and/or precoding information) may be known from NW-CSI-IM index(es) information listed according to respective specific frequency/time resources. The transmission assumption on the sender eNB may be interpreted as meaning that the sender eNB will constantly maintain the transmission assumption thereof on the indicated frequency/time resource. Additionally or alternatively, the transmission assumption for the receiver eNB may be interpreted as meaning that the sender eNB (highly) recommends that the receiver eNB should constantly maintain the transmission assumption on the indicated frequency/time resource. Additionally or alternatively, the transmission assumption for other eNBs (i.e., the other eNBs in the CoMP cluster) may be interpreted as meaning that the sender eNB (highly) recommends that the corresponding eNBs should constantly maintain the transmission assumption on the indicated frequency/time resource.

Accordingly, the receiver eNB may assume that operations of other eNBs are very likely to be performed according to the CCC map, and perform final scheduling decision considering the corresponding CSI feedback information in scheduling a UE having performed CSI feedback reporting on the corresponding NW-CSI-IM index(es).

In the centralized coordination architecture, CCC map signaling as shown in the Table 11 may be defined or configured to be transmitted by only a specific eNB (e.g., the CCN or Marco-eNB). In this case, the receiver eNB may assume that operations of other eNBs will be performed according to the CCC map, and perform final scheduling decision considering the corresponding CSI feedback information in scheduling a UE having performed CSI feedback reporting on the corresponding NW-CSI-IM index(es).

If a plurality of NW-CSI-IM indexes associated with a specific frequency/time resource is indicated and the transmission assumption for the receiver eNB (or other eNBs) differs between the indicated NW-CSI-IM indexes, operation of the receiver eNB (or other eNB) may be defined or configured to be interpreted as "don't care". Alternatively, if three or more NW-CSI-IM indexes are indicated, operation of the receiver eNB (or other eNBs) may be defined or configured based on a larger number of indicated NW-CSI-IM indexes to which the same transmission assumption is indicated.

An integrated Xn-signaling format may be configured by including the utility metric (or preference rating, priority map, or benefit metric) information shown in Table 9 or 10 in the exemplary CCC map shown in the Table 11. An example of this configuration is shown in Table 12. The terms utility metric, preference rating, and priority map mentioned above will be collectively referred to as "benefit metric" in the examples described below.

TABLE 12

| IE/Group Name | Semantics description |
| --- | --- |
| CoMP Coordination CSI-IM map; CCC map | Per PRB (and/or per subframe index based on a subframe bitmap), pair(s) of {NW-CSI-IM index(es), benefit metric} are listed, meaning the transmission assumption for the sender eNB (including transmitted power and/or precoding information) on the REs corresponding to the listed NW-CSI-IM indexes can be assumed to be the same on the indicated PRB (and/or subframe index), and the transmission assumptions for other eNBs within the CoMP cluster (including transmitted power and/or precoding information) on the REs corresponding to the listed NW-CSI-IM indexes are (highly) recommended to be assumed to be the same on the indicated PRB (and/or subframe index). |

Description of Table 11 may be applied to Table 12. Additionally, "benefit metric" information may be provided according to indicated NW-CSI-IM index(es) as well.

In the distributed coordination architecture, the integrated signaling of Table 12 may be interpreted as informing of operations (i.e., a CoMP hypothesis) of the respective eNBs in a CoMP cluster which are recommended/desired by the sender eNB and additionally informing of how beneficial the CoMP hypothesis is to the sender eNB.

In the centralized coordination architecture, if the sender eNB is a CCN or macro-eNB, the integrated signaling of Table 12 may be interpreted as sending a command/notice of an operation (i.e., a CoMP hypothesis) that the respective eNBs in the CoMP cluster need to maintain. Each of the eNBs receiving the signaling may apply the transmission assumption applied on NW-CSI-IM index(es) to the indicated frequency/time resource in the same manner. In this case, the "benefit metric" information of the integrated signaling format transmitted by the CCN does not maintain the original semantics, but may be utilized as a selector bit reserved (or not included) in the integrated signaling format or proposed in the present invention (e.g., if the benefit metric information has a predetermined special value, the integrated signaling may function as a resource coordination command/notice. Otherwise, the benefit metric information may be used to identify signaling transmitted from member network nodes to the CCN). However, the scope of the present invention is not limited thereto. Information different from the benefit metric information may function as the selector bit in the integrated signaling format.

As integrated signaling which may be similar to and used in place of the integrated signaling (or CCC map) of Table 11 or 12, signaling of an improved RNTP/improved ABS type as shown in Table 13 below may be defined.

TABLE 13

| IE/Group Name | Semantics description |
| --- | --- |
| Enhanced RNTP (or Enhanced ABS) map | Per PRB (and/or per subframe index based on a subframe bitmap), Enhanced RNTP (or Enhanced ABS) map(s) are listed, where each enhanced RNTP (or Enhanced ABS) map consists of a (multi-level) RNTP (or Enhanced ABS |

TABLE 13-continued

| IE/Group Name | Semantics description |
|---|---|
| | or preference rating) value for each eNB (within an eNB group, e.g., CoMP cluster). |

Hereinafter, an example of the integrated signaling of Table 13 will be described with reference to FIG. 14.

Figure 14:
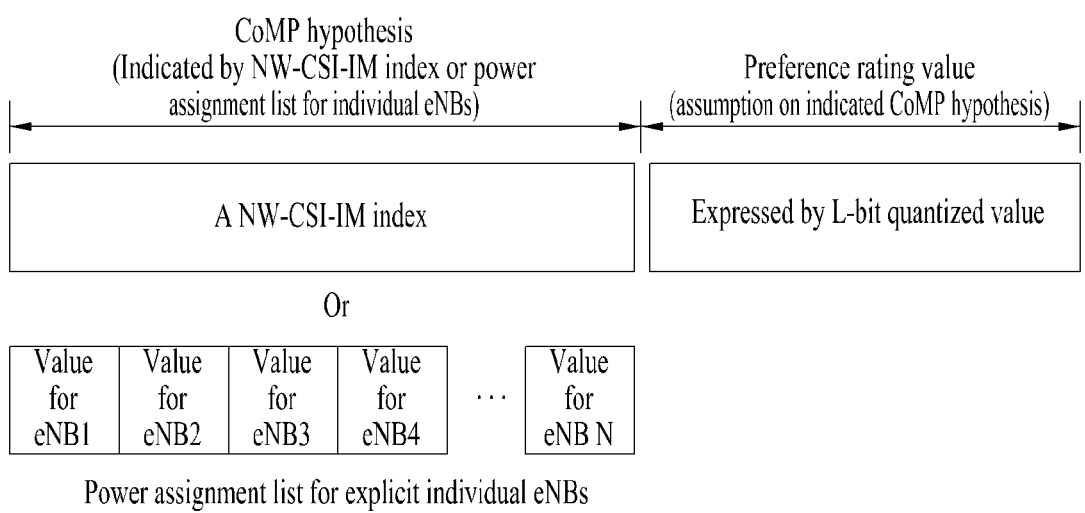
FIG. 14 illustrates an improved RNTP map (or improved ABS map) signaled with respect to a frequency/time resource.

FIG. 14 illustrates an improved RNTP map (or improved ABS map) signaled with respect to a frequency/time resource.

For example, suppose that eNB1 is the sender eNB, and eNB2 is the receiver eNB. In FIG. 14, the value M1 is interpreted as meaning that eNB1 sends a notice indicating that the power assignment thereof does not exceed the value M1. Value M2 is interpreted as meaning that eNB1 recommends to eNB2 that power assignment of eNB2 not exceed the value M2. Values M3, M4, and the like are interpreted as meaning that eNB1 recommends to other eNBs that power assignment of other eNBs (eNB3, eNB4, . . . ) should not exceed the corresponding values (M3, M4, . . . ) and that the receiver eNB2 performs scheduling thereof assuming that other eNBs will operate according to the recommended power assignment values.

In addition, in FIG. 14, candidate values or ranges which may be set to power assignment values M1, M2, M3, M4, . . . may be predefined or preset. For example, a possible range of power assignment values may be between P_min and P_max, and each value means a maximum power threshold value (i.e., indicating one value within the range means power assignment not exceeding the indicated value). Indicating 0 as the power assignment threshold value (e.g., predefining and indicating P_min=0) may mean that muting is performed.

The improved RNTP or improved ABS shown in FIG. 14 extends conventional signaling of RNTP or ABS to multi-level signaling, and includes not only information about the power assignment of the sender eNB but also a recommendation/request of power assignment for other eNBs.

In the examples of the present invention described above, identification of specific eNBs such as eNB1, eNB2, eNB3, . . . may be predefined or preconfigured in the form of a specific eNB set such as the CoMP cluster. Thereby, eNBs for which the values M1, M2, . . . of FIG. 14 are intended may be predefined, or an identifier indicating an eNB for which each power assignment value is intended (e.g., a cell ID of a corresponding eNB) may be signaled together with a power assignment value with which the identifier is paired.

In addition, in the examples of the present invention described above, in order to more clearly indicate that various interpretations as above are applicable to the integrated signaling, a predetermined selector may be defined. That is, the semantics by which the integrated signaling is to be interpreted may be announced by a value of the selector bit.

In the examples described above, Xn-signaling shown in Table 13 may be limited to be transmittable by only a specific eNB (e.g., the CCN or Macro-eNB) in the centralized coordination architecture.

In addition, an integrated signaling format configured by including benefit metric information of Table 12 in the example of Table 13 may be defined as shown in Table 14 below.

TABLE 14

| IE/Group Name | Semantics description |
|---|---|
| Enhanced RNTP (or Enhanced ABS) map | Per PRB (and/or per subframe index based on a subframe bitmap), pair(s) of {Enhanced RNTP (or Enhanced ABS) map(s), benefit metric} are listed, where each enhanced RNTP (or ABS) map consists of a (multi-level) RNTP (or ABS) value for each eNB (within an eNB group, For example, CoMP cluster). |

Table 15 below shows an example of an integrated normal signaling format, which is a generalization of the examples of Tables 7 to 14.

TABLE 15

| IE/Group Name | Semantics description |
|---|---|
| Feature-integrated backhaul signalling (FIBS) | {application type, resource map (ABS or frequency/time map), associated parameter set} are listed, where "application type" will select (at least) one of the following applications - {eICIC, CoMP, eIMTA, NAICS, . . . }, and "resource map" is a predefined form, e.g., ABS subframe (bitmap), frequency/time map, etc., and "associated parameter set" is specifically defined based on each application type. |

In Table 15, for the resource map, an enhanced inter-cell interference coordination (eICIC) ABS pattern signaling format (e.g., a 40-bit ABS pattern designed for eICIC) may be reused.

In addition, if the application type is CoMP, the "associated parameter set" may be configured in the form of a list of one or more elements from a set of {NW-CSI-IM index(es), NW-CSI-RS index(es), NW-CSI-process index(es), improved RNTP map(s) (or improved ABS map(s)), benefit metric (or utility metric, preference rating, priority map), precoding information containing a beam direction/coefficient, parameters (e.g., CSI report, RSRP, SRS power, UPT, PF metric, QCI) used for NIB CoMP operation}.

For other application types such as the eICIC, enhanced interference mitigation & traffic adaptation (eIMTA), and network-assisted interference cancellation and suppression (NAICS), a parameter set including one or more of parameters (e.g., the CoMP application type-related parameters, precoding information, multi-level power information, and modulation order information) associated with the application may be configured or indicated.

For example, if the "application type" is CoMP or eICIC, the "associated parameter set" may include a CSI measurement parameter and CSI-IM mapping-related information.

If the "application type" is NAICS, the "associated parameter set" may include a modulation order, CFI, PMI, RI, MCS, resource allocation, DMRS port, $n^{DMRS}$ID, transmission mode (TM), and RS configuration information. In addition, for NAICS, the associated parameters may be interpreted as information applied for an indicated frequency/time resource map.

The "application type" information may also be indicated by a predetermined index (e.g., 00, 01, . . . ), and the information to be included in the "associated parameter set" may be indicated according to the index value. Alternatively, the "application type" information may be defined as being optional. In this case, information to be included in the "associated parameter set" or how the set is to be interpreted may be set to a default. Alternatively, a specific "application type" (or a specific index indicating the application type)

may be defined or configured to be implicitly indicated according to the information configuration type of the "associated parameter set".

For the Xn-signaling formats proposed in the examples described above, formats for higher layer signaling (e.g., RRC signaling) exchanged between an eNB and a UE may also be applied. For example, when the UE receives RRC signaling, the UE may recognize an operation (or transmission assumption) of eNBs in a CoMP cluster, and perform CoMP reception considering the recognized operation.

Additional Example 2 of Inter-NIB CoMP eNB Signaling

The following information may be signaled on an Xn interface (e.g., X2 interface) between eNBs NIB CoMP:
  One or more sets of CSI reports (RI, PMI, CQI) on individual UEs;
  One or more measurement reports (RSRP) on individual UEs;
  SRS reception power for individual UEs;
  User perceived throughput (UPT) for individual UEs;
  Resource usage information according to each cell;
  PF metrics for individual UEs;
  Information of an improved RNTP type defined in the frequency/time/power/space domain;
  Improved ABS information defined in the power and space domain;
  QCI;
  Indication of a resource coordination result or resource coordination request (resource allocation in the frequency/time/power/space domain);
  Information indicating configurations used for a reference signal, CSI process and CSI-IM configuration;
  Information indicating a coordination result or coordination request for a reference signal configuration, CSI process and CSI-IM configuration;
  Preconditions for CoMP To perform NIB CoMP operation, information on predetermined preconditions (e.g., information on configurations used for a reference signal, CSI process and CSI-IM configuration) needs to be provided in a CoMP cluster. Although the reference signal configuration, CSI process and CSI-IM configuration are provided to a UE through UE-dedicated RRC signaling, CSI-RS and CSI-IM configurations are preferably pre-subjected to network-wise (NW) coordination by O&M (operation and maintenance) or backhaul signaling support. For example, an NW CSI-IM index set may be predefined in the CoMP cluster and indicate muting/non-muting or "don't care" operation of each eNB on each CSI-IM resource. In addition, some of the indexes of the NW CSI-IM index set may be selected and configured for a UE associated with a corresponding eNB through RRC signaling by the eNB signaling.

To raise flexibility for operation of individual eNBs according to each CSI-IM resource, multi-level power assignment and/or precoding information configuration for CB, for example, may be signaled in the CoMP cluster. Similar to the example of CSI-IM, an NW RS configuration index, and an NW CSI process configuration index may be configured in the CoMP cluster.

Integrated Signaling for Resource Coordination

Considering that the kinds of information necessary for NIB CoMP resource coordination have a common purpose (e.g., resource coordination request/recommendation in the CoMP cluster or a resource coordination result/notice), signaling of the information is preferably simplified and unified.

The resource coordination request/recommendation provides element information for CoMP scheduling from a member eNB to a CCN, and may include, for example, one or more sets of CSI reports (RI, PMI, CQI) on individual UEs, one or more measurement reports (RSRP) on individual UEs, SRS reception power for individual UEs, UPT for individual UEs, resource usage information according to each cell, QCI, PF metrics for individual UEs, indication of a resource coordination request (resource allocation in the frequency/time/power/space domain), indication of a coordination request for a reference signal configuration/CSI process/CSI-IM configuration.

The resource coordination result/notice is to send a notice of a coordination result from the CCN to member eNBs and may include, for example, indication of a resource coordination result (resource allocation in the frequency/time/power/space domain) and indication of a coordination result for a reference signal configuration/CSI process/CSI-IM configuration.

Of the two types of signaling as above, signaling for resource coordination request/recommendation preferably defines an integrated signaling format rather than defining various different signaling formats.

In addition, the information about the "individual UEs" may not necessarily be shared in a cluster. Instead, in view of the sender eNB, it may be more efficient for the information to include information about "a UE to be scheduled" on the specific frequency/time resource map. Each eNB performs final scheduling decision (i.e., final determination of a UE to be scheduled) on its own. Sharing information about all possible UEs to be scheduled of an eNB with other eNBs may cause unnecessary overhead for information exchange, and thus sharing only information about best (or representative) UEs is sufficient.

In the centralized coordination architecture, information such as CSI report information, RSRP, SRS power, UPT, and QCI for each UE may not be necessarily needed. It may be only needed to share a preference rating value (utility metric, PF metric, or benefit metric) for best or representative UEs to be scheduled according to each frequency/time resource. This is because sharing information in the CoMP cluster is intended for resource coordination between eNBs, not for final scheduling determination of individual eNBs. Accordingly, a simplified preference rating value (or benefit metric value) may be used.

Simplified preference rating information (or benefit metric information) about a specific frequency/time resource map is preferably signaled together with an indication of an assumed CoMP hypothesis. Herein, the CoMP hypothesis is an assumption on operation of eNBs in the CoMP cluster (e.g., eNB1 performs muting, and eNB2 does not perform muting), and may be expressed in a simple form using a predefined NW-CSI-IM index or an explicit power assignment list for individual eNBs.

FIG. 15 illustrates a benefit metric signaled together with a CoMP hypothesis for a frequency/time resource map.

In FIG. 15, the CoMP hypothesis may be indicated by a power assignment list for individual eNBs. The power assignment list may be configured to explicitly indicate the power assignment value for eNB1, the power assignment value for eNB2, . . . , and the power assignment value for eNB N. Alternatively, the CoMP hypothesis may be indicated in a simpler form such as an NW CSI-IM index. That is, one index value may indicate operation of individual eNBs.

The preference rating value may be defined as an integer between 0 and L (L>0). For example, L may be set to 100. The preference rating value may be expressed as a level of preference in consideration of a scheduling benefit which the sender eNB expects assuming that the indicated CoMP hypothesis is applied. Alternatively, the benefit metric value described in FIG. 13 may be applied in place of the preference rating value.

Hereinafter, interpretation of an example of the integrated signaling format of FIG. 15 will be described.

In the centralized coordination architecture, if the sender eNB is not the CCN but a member eNB, the integrated signaling of FIG. 15 is interpreted as indicating a resource coordination request/recommendation in view of the member eNB. Thereby, the CCN may perform coordination decision based on all information provided from member eNBs. Each member eNB may provide a plurality of signals, and each signal may include information indicating a different preference rating value (or benefit metric value) for a different CoMP hypothesis (hypothesis for operations of the sender eNB and other eNBs).

If the sender eNB is the CCN in the centralized coordination architecture, the integrated signaling of FIG. 15 is interpreted as indicating a resource coordination result/notice determined by the CCN, and all member eNBs receiving the signaling conform to details of the notice. Specifically, each receiver eNB needs to maintain operation on the indicated frequency/time resource with the same details (e.g., the transmit power value, whether to perform muting, precoding, etc.) of operation on a CSI-IM resource indicated by an NW-CSI-IM index indicating the CoMP hypothesis assumed in FIG. 15. Only in this case, may each eNB make a final UE scheduling decision thereof on the indicated frequency/time resource by directly applying the latest CSI feedback report of the UE based on the corresponding CSI-IM resource on the assumption that operation of other eNBs is guaranteed as indicated. In addition, according to this method, each eNB may select a type of a signal transmitted on the CSI-IM resource without restriction. Thereby, the CB type CoMP technique may be utilized on the NIB condition.

In FIG. 15, for a format in which an explicit power assignment list of individual eNBs (identified by cell ID indications of individual eNBs), the transmit power of a corresponding eNB on the indicated frequency/time resource should not exceed a value indicated as the power threshold value of the eNB. The power threshold may be set to different levels. If the corresponding signaling is transmitted from the CCN, this may be interpreted as improved RNTP/ABS signaling including operation of a plurality of eNBs.

If the sender eNB of the format of FIG. 15 is a CCN, the preference rating information (or benefit metric information) may be omitted or set to a fixed value. This is because signaling from the CCN in the centralized coordination architecture is interpreted as a resource coordination result/notice. That is, since the CCN functions to perform resource coordination decision in consideration of preference rating information (or benefit metric information) which the member eNB expects, preference rating information (or benefit metric information) that the CCN expects does not need to be provided to the member eNB. If signaling transmitted from the member eNB to the CCN and signaling transmitted from the CCN to the member eNB are defined in an integrated signaling format as in this embodiment, the preference rating information (or benefit metric information) may be set to a fixed/special value indicating that the signaling is the type of a notice/command of the resource coordination decision that the CCN transmits to the member eNB, may be omitted, or may be reserved.

For the integrated signaling of FIG. 15, in the distributed coordination architecture, most of the description given above of the case where the sender eNB is not the CCN in the centralized coordination architecture may be applied. For example, if the sender is eNB1 and the receiver is eNB2, the integrated signaling of FIG. 15 is interpreted as a resource coordination request/recommendation including the preference rating value of eNB1 from eNB1. The receiver eNB2 may consider the received information for scheduling decision thereof.

Specifically, eNB2 may consider that the information about operation of the sender eNB1 is guaranteed to be applied to eNB1 later. Thereby, the receiver eNB2 may utilize a CSI feedback report of a relevant UE. The information about the operation of the receiver eNB2 may be considered when eNB2 operates in the best effort manner. In the distributed coordination architecture, lots of such signaling may be exchanged, and thus the receiver eNB2 may also consider information about operation of other eNBs in performing scheduling thereof. For example, the most commonly preferred CoMP hypothesis (i.e., a CoMP hypothesis to which a large number of eNBs has assigned a higher preference rating value than to the other CoMP hypotheses) may be used as an assumption on final scheduling decision of the receiver eNB2.

Signaling Applied to Distributed Coordination Architecture

In the distributed coordination architecture, improved RNTP-type information (e.g., a frequency/time/power/space domain) and improved ABS information (e.g., a power/space domain) may be signaled. Such information is recognized as a notice of operation of the sender eNB related to the power level and/or beamforming information of the sender eNB on an indicated frequency/time resource.

In contrast with existing RNTP/ABS (almost blank subframe) signaling, the resource configuration granularity is extended to the two-dimensional domain of a frequency-time resource map, multi-level power assignment information is indicated, and indication information (e.g., precoding information) in the space domain is included in signaling.

The integrated signaling of FIG. 15 format may be applied to both the centralized coordination architecture (e.g., the sender eNB is not the CCN) and the distributed coordination architecture and used to notify of operation of the sender eNB. Accordingly, the integrated signaling may also include improved RNTP/ABS signaling. The integrated signaling format of FIG. 15 may also be used to request/recommend operation of other eNBs. Accordingly, the improved RNTP/ABS type information may be viewed as signaling for subset information of the integrated signaling format. That is, an information element for the preference rating value and/or an information element requesting/recommending operation of other eNBs in the integrated signaling of FIG. 15 are designed as optional elements, a flexible signaling format allowing the network operator to be used both in the centralized coordination architecture and the distributed coordination architecture may be defined.

However, if signaling applied to only the distributed coordination architecture is introduced, the improved RNTP/ABS type information signaling may be separately defined, and the integrated signaling format as shown in FIG. 15 may be defined as properly supporting the centralized coordination architecture of NIB CoMP.

In this case, status report signaling (i.e., feedback information from the receiver eNB) about usage on the indicated frequency/time resource may be needed. For example, a feedback report on how much of the information indicated by the sender eNB is used for non-CoMP UE and CoMP UE scheduling is used may be sent. Similar to the existing ABS status report, the feedback information may be used when each eNB determines the next backhaul signaling in consideration of feedback information from other eNBs.

Configuration Granularity for Xn-Signaling

In the examples described above, the benefit metric may be Xn-signaled in association with a CoMP hypothesis.

The CoMP hypothesis includes hypothetical resource allocation for at least a receiver node in the time/frequency domain.

How to respond to the received CoMP hypothesis signaling depends on implementation of the receiver eNB, or the receiver eNB may send the transmitter node a feedback (e.g., YES/NO) indicating acceptance/rejection of the hypothesis.

A configuration granularity and rate needed for the CoMP hypothesis in the time/frequency domain may be given as follows. For example, the CoMP hypothesis may have a signaling period of a maximum T (T=5) ms. In addition, the CoMP hypothesis may be signaled in the form of a bitmap in a subframe unit identified by a subframe index defined based on the number of subframes equal to the signaling period, in a cell unit identified by a cell ID in a coordination region (e.g., a CoMP cluster), or with a configuration granularity of one RB.

Herein, the signaling configuration granularity maybe viewed as an example of the specific time interval and/or specific band of 1-way signaling and 2-way signaling for the SSPM.

Alternatively, the CoMP hypothesis may be signaled in the form of a bitmap with a configuration granularity of one band rather than one RB. This example is implemented considering that the minimum configuration granularity of CSI feedback of the UE is a subband unit. For the subband which is a configuration granularity for Xn-signaling of the CoMP hypothesis, a transmitter node (i.e., a sender eNB) may deliver the system bandwidth thereof together with Xn-signaling for delivering the CoMP hypothesis or as separate Xn-signaling.

For example, the size of the subband according to the system bandwidth may be defined as shown in Table 16 or 17 below.

TABLE 16

| System Bandwidth $N_{RB}^{DL}$ | Subband Size (k) |
| --- | --- |
| 6-7 | NA |
| 8-10 | 4 |
| 11-26 | 4 |
| 27-63 | 6 |
| 64-110 | 8 |

TABLE 17

| System Bandwidth $N_{RB}^{DL}$ | Subband Size k (RBs) | Bandwidth Parts (J) |
| --- | --- | --- |
| 6-7 | NA | NA |
| 8-10 | 4 | 1 |
| 11-26 | 4 | 2 |
| 27-63 | 6 | 3 |
| 64-110 | 8 | 4 |

Table 16 defines a subband size (in units of RB) according to the system bandwidth, and Table 17 defines a relationship among a DL system bandwidth, a bandwidth part, and a subband size (in units of RB) in the case of periodic CSI reporting.

Alternatively, the subband size defined according to the system bandwidth may be defined as shown in Table 18 below.

TABLE 18

| System Bandwidth $N_{RB}^{DL}$ | Subband Size k (RBs) | M |
| --- | --- | --- |
| 6-7 | NA | NA |
| 8-10 | 2 | 1 |
| 11-26 | 2 | 3 |
| 27-63 | 3 | 5 |
| 64-110 | 4 | 6 |

Table 18 defines a relationship among a DL system bandwidth, a bandwidth part, and a subband size (in units of RB) in the case of aperiodic CSI reporting. Compared to the example of Table 16 or 17, the subband sizes are small in the same system bandwidth, and thus the configuration granularity of the subband may be understood as being finer than that of the previous examples.

Using the subband configuration granularity, the frequency domain configuration granularity of the CoMP hypothesis may be defined.

In addition, CSI information about a UE set may be Xn-signaled. A configuration granularity for this signaling may be defined as a subband configuration granularity shown in Table 16, 17 or 18.

For example, one or more sets of CSI information may be Xn-signaled for a set of UEs. A necessary rate for exchange of the one or more sets of CSI information may be given as follows. For example, a signaling period of up to 5 ms may be given, and aperiodic CSI reporting provided according to the request from an eNB may be supported. In addition, one or more sets (up to 4 sets) of CSI information and an assumption on a CSI process (identified by a cell-specific CSI process ID) associated with each CSI information set may be signaled in a subframe unit identified by a subframe index defined based on the number of subframes equal to the signaling period, in a cell unit identified by a cell ID, in the subband unit identified by a subband index (wherein the size of the subband may be a size listed in Table 16, 17 or 18), or in a UE unit identified by a UE ID.

In order to signal an assumption for a CSI process associated with the CSI information, information (e.g., one NZP CSI-RS resource, one CSI-IM resource, or the like) contained in each CSI process ID set for the UE may be signaled along with Xn-signaling for the CSI information set or separately. Alternatively, while CSI process configuration information for each individual UE and a corresponding CSI process ID are pre-exchanged or pre-known among a plurality of eNBs (e.g., a CSI process ID such as the "cell-specific CSI process ID" uniquely identifiable between eNBs by OAM (Operation And Management) in a network-wise (NW) manner is preconfigured), a CSI process ID (i.e., NW-CSI-process ID) only needs to be signaled for an "assumption for an associated CSI process".

In order to signal the "assumption for a CSI process associated with each CSI information set", a format for signaling an assumption for a CoMP hypothesis (regardless of the frequency/time resource configuration granularity) may be used. That is, the assumption may be extended to signal that the CSI information set corresponds to a specific CoMP hypothesis. Herein, while the original CoMP hypothesis is defined based on the frequency/time resource configuration granularity, the CSI information set is signaled based only on the power assignment status of each eNB (i.e., a CoMP hypothesis is needed only for the purpose of indicating a cell to perform muting as in the case of a CSI-IM configuration included in a CSI process, and not needed to express operation of each cell on a frequency/time resource). Accordingly, in signaling a CSI information set associated with a CoMP hypothesis, a definition of "Regardless of the frequency/time resource configuration granularity" may be defined.

As an additional example of a configuration granularity and rate of a CoMP hypothesis, a CoMP hypothesis signaling period (i.e., T ms) may be set in consideration of feedback periods set for individual UEs. For example, the T value may not be predefined, but may be determined and signaled (along with signaling of a CoMP hypothesis and benefit metric or separately) by the sender eNB. If the value of T is delivered every time the sender eNB transmits signaling including a CoMP hypothesis and benefit metric (or once per a plurality of signals), this may indicate that every time the value of T changes, signaling including the CoMP hypothesis and benefit metric is transmitted with the changed periodicity of T ms. That is, if the value of T is not included, this may indicate that the value of T as previously signaled is applied. For example, if a changed value T2 is signaled after a value T1 is signaled, this means that a signaling including a CoMP hypothesis and benefit metric is transmitted according to a period T2 until another changed value T3 is signaled.

Alternatively, the period T of signaling including a CoMP hypothesis and benefit metric may be signaled as requested/designated by the receiver eNB. This may mean that the receiver eNB signals a desired period of receiving signaling including a CoMP hypothesis and benefit metric. Thereby, the sender eNB may transmit signaling in consideration of such value of T. Alternatively, the sender eNB may not need to reflect the value T1 desired by the receiver eNB. Instead, the sender eNB may transmit signaling according to period T2 which the sender eNB desires in consideration of the value T1. If signaling is transmitted according to period T2 different from the value T1 desired by the receiver eNB, information about the signaling period T2 may be transmitted to the receiver eNB.

In a situation in which signaling including a CoMP hypothesis, CSI information set and benefit metric is transmitted according to period T, the CSI information set includes information about a set of UEs, and the UEs included in the set of UEs may change at every signaling transmission time. This is because each UE may have a different feedback period. For example, if the feedback period of UE1 is 5 ms, and the feedback period of UE2 is 10 ms, signaling including the CSI information set may be transmitted with T set to 5 ms. Thereby, a "set of UEs" related to a CSI information set at a specific transmission time may include only UE1, and a "set of UEs" related to a CSI information set at the next transmission time after 5 ms may include only UE2.

CB Technique

Figure 16:
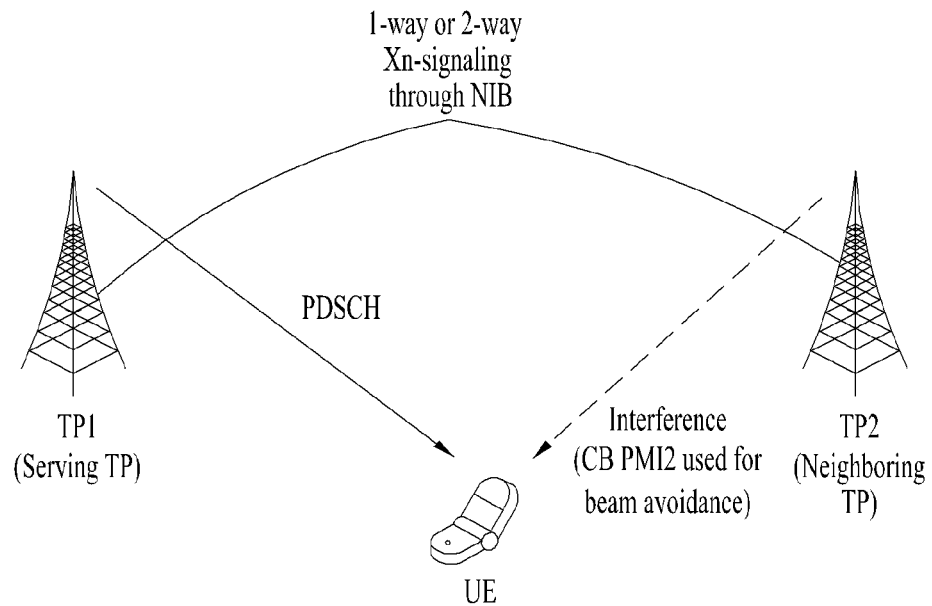
FIG. 16 illustrates a CB technique.

FIG. 16 illustrates a CB technique.

CB is a technique for minimizing interference of a beam transmitted from a TP participating in CoMP that affects a UE which another TP serves. For example, as shown in FIG. 16, to perform data transmission to UE2 associated with TP2, TP2 may select a precoder (e.g., PMI2) allowing beam avoidance such that interference affecting UE1 served by TP1 is minimized. To this end, TP1 and TP2 are required to exchange change state information such as PMI through Xn-signaling in an NIB environment.

1-Way Xn-Signaling for Initiation of CB

Xn-signaling for CB may be defined to be broadcast (or unicast or multicast to one or more other TPs) by a specific TP (e.g., TP2 of FIG. 16) in 1-way.

In this case, the information provided by a TP transmitting Xn-signaling may be a message informing of a PMI which the TP is to apply in a "specific band" in a "specific time interval".

The PMI information contained in the Xn-signaling may be a single PMI or a PMI set including two or more PMIs. Other TPs receiving the PMI information may select and schedule UEs which will be affected by minimum interference from a beam formed by the PMI set. Alternatively, TP1 may compare the "PMI set" contained in Xn-signaling transmitted by TP2 and the optimum PMI2 measured by UEs with respect to TP2, and then select, as scheduling targets, UE(s) reporting PMI2 most orthogonal to the "PMI set". Then, a UE minimizing interference from TP2 may be scheduled. Thereby, signal quality may be improved by beam avoidance.

Herein, the "specific time interval" may have a value indicated by a predetermined time unit (e.g., subframe). In addition, the "specific time interval" may be expressed as time information (e.g., continuous or discontinuous time information configured in the form of a subframe bitmap) indicating the start time and end time of CB based on a reference time that is clearly known between TPs. In addition to the aforementioned form of a subframe bitmap, a time (e.g., a specific subframe index) at which the "specific time interval" starts may be explicitly indicated, or the number of cycles completed by the subframe bitmap before the "specific time interval" ends at a given time (e.g., a specific subframe index) may be explicitly indicated.

To express such "specific time interval", a frame number (e.g., a system frame number (SFN)) at which a CoMP operation (muting/non-muting, etc.) is applied (or started) may be used. For example, the CoMP operation may be applied in a radio frame explicitly indicated by an SFN contained in Xn-signaling. In this case, the frame number (e.g., SFN) may be defined based on timing of a TP transmitting Xn-signaling. Alternatively, if the TP transmitting Xn-signaling is aware of information about timing of a TP receiving the Xn-signaling, the SFN value may be set to a value based on timing of the TP receiving the Xn-signaling and transmitted.

In addition, the "specific band" may be set to a value expressed by a predetermined frequency unit (e.g., RB unit).

2-Way Xn-Signaling for Initiation of CB

Xn-signaling for CB may be defined as 2-way signaling implemented in a manner that TP1 makes a request to TP2 for performing CB based on a specific PMI set (information about one or more PMIs) CB, and TP2 sends a response to TP1. In this case, the response message transmitted by TP2 may be multicast/broadcast to TP1 and other TPs (e.g., TP3, TP4, . . . ), or may be individually unicast to TP1 and other TPs by TP2.

Herein, the information contained in the request message transmitted by TP1 may be a message requesting that TP2 perform CB using a specific PMI set (information about one or more PMIs) for a "specific band" in a "specific time interval".

For the "specific time interval" and "specific band", the same features of 1-way Xn-signaling for CB described above may be applied.

In this example, a "specific condition" for transmission of the request message from TP1 may be defined.

For example, TP1 and TP2 may compare traffic load situations thereof (through exchange of Xn-signaling), and if the difference between the load situations is greater than or equal to a predetermined reference value, this may satisfy a condition for transmitting the request message.

Herein, only if the value of the load situation of TP2 is well below a predetermined reference value, the request may be allowed. Alternatively, if the value of the load situation of TP2 is greater than the predetermined reference value, TP2 may reject the delivered request.

The "specific condition" may be defined such that priorities are preset between the TPs (e.g., TP1 may be preset as a master, and TP2 may be preset as a slave), and thus when TP1 sends the request according to the priorities, TP2 must conform to the request.

If TP1 is pre-provided with information pre-confirming that TP2 will accept the request, through information such as the loading information, information about one or more CSI-RS configurations, information about one or more CSI-IM (or IMR) configurations, or DMRS configuration information, which is pre-exchanged through Xn-signaling, the CB operation may be initiated simply by a muting request for CB which TP1 sends to TP2 (namely, without a response from TP2).

If a specific condition for transmission of the request message is defined as above, and the request message is transmitted from TP1 as the condition is satisfied, TP2 receiving the request message may accept the request. The case in which TP2 should obey the request of TP1 if a specific condition is satisfied (or the case in which TP2 obeys the request without sending a response message to TP1) may be called conditional 1-way Xn-signaling.

Xn-Signaling During CB Operation

If CB is initiated through 1-way or 2-way Xn-signaling in a specific band in a specific time interval, CB may be defined as automatically ending when the time interval ends. Alternatively, the time interval may be extended through additional Xn-signaling (e.g., 1-way signaling or 2-way signaling) before the time interval ends. The information about the extended time interval may be updated with new type time information, and the band information may be updated with new type band information.

Xn-Signaling for Feedback for CB

Xn-signaling for feeding back usage information about whether PDSCH transmission for scheduling a CoMP UE in consideration of the CB (e.g., MCS configuration in consideration of CB) has been performed may be additionally defined in or after the CB time interval.

By recognizing the usage indicating whether a time interval and band in which neighboring TPs have conducted CB have been actually used in scheduling a corresponding CoMP UE, unnecessary application of the CB operation may be prevented.

Combination of SSPS and CB

For the CB operation described above, the TP transmitting the PDSCH may be basically a fixed TP (e.g., TP1 of FIG. 16), and neighboring TPs (e.g., TP2) may use a PMI to which beam avoidance according to CB is applied. Herein, CB may be combined with semi-static point switching (SSPS) such that the TP transmitting a PDSCH is changed by SSPS (to, for example, TP2) (e.g., TP1 and TP2 alternately transmit the PDSCH on a specific resource), and neighboring TPs (e.g., TP1) may apply CB. As such, functions of TP1 and TP2 may be switched.

Figure 17:
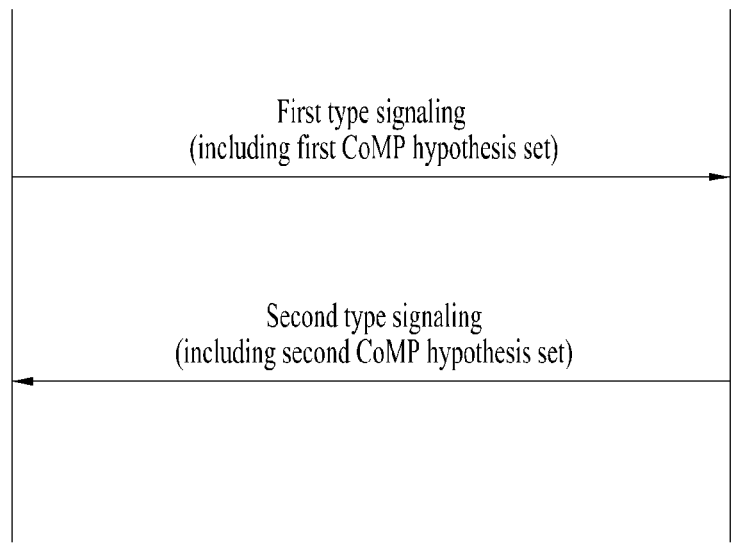
FIG. 17 is a flowchart illustrating a signaling method according to an embodiment of the present invention.

FIG. 17 is a flowchart illustrating a signaling method according to an embodiment of the present invention.

In FIG. 17, a first network node and a second network node are network nodes participating in or involving in CoMP on an NIB network. For example, the first and second network nodes may be network nodes participating in CoMP in the distributed coordination architecture, and may correspond to a member node and a CCN in the centralized coordination architecture.

In step S1710, the first network node may transmit first type signaling to the second network node. The first type signaling may include one or more CoMP hypotheses (i.e., a first CoMP hypothesis) in view of the first network node, and additionally include a benefit metric for each CoMP hypothesis. The first type signaling may be interpreted as resource coordination request/recommendation signaling.

In step S1720, the first network node may receive second type signaling from the second network node. The second type signaling may include one or more CoMP hypotheses (i.e., a second CoMP hypothesis) in view of the second network node, and additionally include a benefit metric for each CoMP hypothesis. In the distributed coordination architecture, the second type signaling may be resource coordination request/recommendation signaling in view of the second network node, or resource coordination result/notice signaling for the first network node.

In the centralized coordination architecture, the first type signaling may be resource coordination request/recommendation signaling sent from the member node to the CCN, and the second type signaling may be resource coordination result/notice signaling sent from the CCN to the member node.

The first and second type signaling may be configured by an integrated signaling format (or information element format) proposed in the present invention. That is, the first and second type signaling may use the same signaling format, and be identified/distinguished by the content of the signaling. For example, a specific bit of the integrated signaling format may function to identify the first type/second type signaling (e.g., benefit metric information has a meaning only in the first type signaling in the centralized coordination architecture, and therefore a bit corresponding to the benefit metric information may be set to a special value in the second type signaling to indicate the second type signaling).

Each of the first and second CoMP hypotheses may include information about transmission assumptions for the respective CoMP network nodes according to CSI-process indexes. That is, transmit power levels (including whether to perform muting) of the respective CoMP network nodes on the assumption of a specific CSI-process and precoding information may constitute CoMP hypothesis information. Herein, a CSI-process index may be defined as a value that is uniquely identified in a network (i.e., as a network-wise (NW) index). Further, an NZP CSI-RS index and CSI-IM index constituting the CSI-process may be defined as an NW-NZP-CSI-RS index and NW-CSI-IM index, respectively.

Each of the CoMP hypotheses may be defined as a "CoMP hypothesis set" together with ID (e.g., cell ID) information for identifying corresponding CoMP network nodes. That is, information explicitly indicating a cell for which a CoMP hypothesis is intended may be included in the first or second type signaling.

Regarding the method described above with reference to FIG. 17, various embodiments of the present invention described above may be independently applied or two or more of the embodiments may be simultaneously applied. Redundant description of the embodiments will be omitted.

While FIG. 17 illustrates operations for the exemplary method in series for simplicity, this is not intended to limit the order in which the operations are performed. Operations may be performed simultaneously or in a different order if necessary. Further, not all steps illustrated in FIG. 17 are essential to implementation of the proposed method of the present invention.

Figure 18:
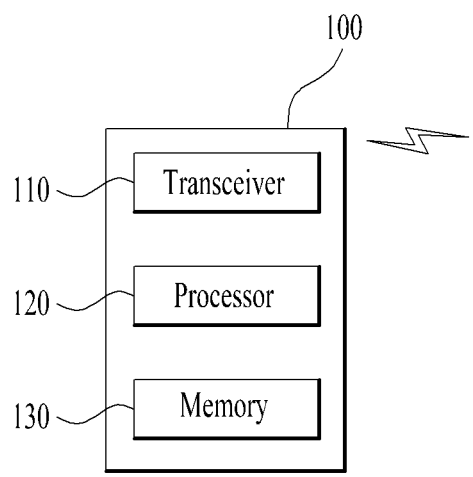
FIG. 18 is a diagram illustrating configuration of a preferred embodiment of a network node of the present invention.

FIG. 18 is a diagram illustrating configuration of a network node according to a preferred embodiment of the present invention.

Referring to FIG. 18, a network node 100 may include a transceiver 110, a processor 120, a memory 130, and a plurality of antennas. The transceiver 110 may receive various signals, data and information from external devices (e.g., a UE). The transmit module 12 may exchange various signals, data and information with an external device (e.g., a UE) or another network node. The processor 120 may control overall operation of the network node 100. The antennas mean that the network node 100 supports MIMO transmission and reception.

According to an embodiment, the network node 100 may be configured to perform or support CoMP transmission on a wireless communication network. The processor 120 may be configured to transmit first type signaling containing one or more first CoMP hypothesis sets from a first network node to a second network node, using the transceiver 110. In addition, the processor 120 may be configured to receive second type signaling containing one or more second CoMP hypothesis sets from the second network node at the first network node, using the transceiver 110.

The processor 120 of the network node 100 may additionally function to computationally process information which the network node 100 has received from the outside, and the memory 130 may store the computationally processed information for a predetermined time and may be replaced by an element such as a buffer (not shown).

The network node 100 may correspond to an eNB, a TP and the like that participate in CoMP operation.

Regarding the specific configuration of the network node 100, various embodiments of the present invention described above may be independently applied or two or more of the embodiments may be simultaneously applied. Redundant description of the embodiments will be omitted.

In the embodiments described above, an eNB has been mainly given as an example of a DL transmission entity or UL reception entity, and a UE has been mainly given as an example of a UL reception entity or UL transmission entity. However, the scope of the present invention is not limited thereto. For example, description of the eNB may also be applied when a cell, AP, AP group, RRH, transmission point, reception point, access point, relay or the like serves as a DL transmission entity or UL reception entity with respect to the UE. In addition, the principle of the present invention described through various embodiments of the present invention may be applied even in the case where the relay serves as a DL transmission entity or UL reception entity with respect to the UE or in the case where the relay serves as a UL transmission entity or DL reception entity with respect to the eNB.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention described above are applicable to various mobile communication systems.

The invention claimed is:

1. A method for performing Coordinated Multi-Point (CoMP) transmission in wireless communication network, the method comprising:
   receiving, by a first network node, CoMP information comprising at least one CoMP hypothesis set and at least one benefit metric information bit from a second network node; and
   performing, by the first network node, CoMP transmission based on the CoMP information;
   wherein the at least one CoMP hypothesis set and the at least one benefit metric information bit are defined in information element format included in the CoMP information;
   wherein information indicated by the at least one benefit metric information comprises specific information, for which the at least one benefit metric information configured as special value, and
   wherein the CoMP information further comprises information on starting frame number of the CoMP transmission.

2. The method according to claim 1, wherein the information indicated by the at least one benefit metric information comprises benefit metric.

3. The method according to claim 2, wherein the benefit metric has quantized value.

4. The method according to claim 3, wherein the quantized value is determined based on expected value under assumption that the at least one CoMP hypothesis set is applied.

5. The method according to claim 2, wherein the each of the at least one CoMP hypothesis set is associated with the benefic metric.

6. The method according to claim 1, wherein the at least one CoMP hypothesis set comprises identification (ID) of the CoMP network nodes and information on hypothetical operation of CoMP network nodes.

7. The method according to claim 1, wherein a link between the CoMP network nodes corresponds to non-identical-backhaul (NIB) link.

8. The method according to claim 1, wherein an interface between the CoMP network nodes corresponds to X2 interface.

9. The method according to claim 1, wherein the second network node corresponds to central control node of centralized coordination architecture.

10. A network node apparatus for performing Coordinated Multi-Point (CoMP) transmission in wireless communication network, the apparatus comprising:
   transceiving unit; and
   processor;
   the processor is configured to:
      receive CoMP information comprising at least one CoMP hypothesis set and at least one benefit metric information bit from a second network node, and
      perform CoMP transmission based on the CoMP information,
   wherein the at least one CoMP hypothesis set and the at least one benefit metric information bit are defined in information element format included in the CoMP information,
   wherein information indicated by the at least one benefit metric information comprises specific information, for which the at least one benefit metric information configured as special value, and
   wherein the CoMP information further comprises information on starting frame number of the CoMP transmission.

* * * * *